United States Patent [19]

Takeshima et al.

[11] Patent Number: 5,473,887
[45] Date of Patent: Dec. 12, 1995

[54] EXHAUST PURIFICATION DEVICE OF INTERNAL COMBUSTION ENGINE

[75] Inventors: Shinichi Takeshima; Kiyoshi Nakanishi, both of Susono; Satoshi Iguchi, Mishima; Toshiaki Tanaka, Numazu; Yasushi Araki; Shinya Hirota, both of Susono; Kiyoshi Kobashi, Mishima, all of Japan

[73] Assignee: Toyota Jidosha Kabushiki Kaisha, Toyota, Japan

[21] Appl. No.: 66,100

[22] PCT Filed: Oct. 2, 1992

[86] PCT No.: PCT/JP92/01279

§ 371 Date: Jun. 14, 1993

§ 102(e) Date: Jun. 14, 1993

[87] PCT Pub. No.: WO93/07363

PCT Pub. Date: Apr. 15, 1993

[30] Foreign Application Priority Data

Oct. 3, 1991 [JP] Japan ..................................... 3-281907
Oct. 4, 1991 [JP] Japan ..................................... 3-284095

[51] Int. Cl.$^6$ ..................................................... F01N 3/20
[52] U.S. Cl. ............................. 60/276; 60/285; 60/297; 60/301
[58] Field of Search ........................... 60/274, 276, 297, 60/301, 285

[56] References Cited

U.S. PATENT DOCUMENTS

| | | |
|---|---|---|
| 3,086,353 | 4/1963 | Ridgway . |
| 3,303,003 | 2/1967 | Zimmer . |
| 3,716,996 | 2/1973 | Maruoka . |
| 3,747,346 | 7/1993 | Onoda et al. . |
| 3,795,730 | 3/1974 | Kalvinskas . |
| 3,926,590 | 12/1975 | Aibe et al. . |
| 4,033,123 | 7/1977 | Masaki et al. . |
| 4,104,361 | 8/1978 | Nishikawa et al. . |
| 4,615,173 | 10/1986 | Usui et al. . |
| 4,760,044 | 7/1988 | Joy, III et al. . |

(List continued on next page.)

FOREIGN PATENT DOCUMENTS

| | | |
|---|---|---|
| 0503882 | 9/1992 | European Pat. Off. . |
| 53-115687 | 10/1978 | Japan . |
| 59-188053 | 10/1984 | Japan . |
| 60-164642 | 8/1985 | Japan . |
| 61-112715 | 5/1986 | Japan . |
| 61-181538 | 8/1986 | Japan . |
| 62-97630 | 5/1987 | Japan . |
| 62-117620 | 5/1987 | Japan . |
| 62-106826 | 5/1987 | Japan . |
| 63-38619 | 3/1988 | Japan . |
| 63-270543 | 11/1988 | Japan . |
| 64-30643 | 2/1989 | Japan . |
| 1134020 | 5/1989 | Japan . |
| 1-56816 | 12/1989 | Japan . |
| 2149346 | 6/1990 | Japan . |
| 3-16641 | 1/1991 | Japan . |
| 4-141219 | 5/1991 | Japan . |
| 3-124909 | 5/1991 | Japan . |
| 3135417 | 6/1991 | Japan . |
| 4-4044 | 1/1992 | Japan . |

*Primary Examiner*—Douglas Hart
*Attorney, Agent, or Firm*—Kenyon & Kenyon

[57] ABSTRACT

An $NO_x$ absorbent (18) is disposed in an exhaust passage of an internal combustion engine and the exhaust gas is constantly made to circulate through the $NO_x$ absorbent (18) during the operation of the engine. The $NO_x$ absorbent (18) absorbs the $NO_x$ when the air-fuel ratio of the exhaust gas flowing into the $NO_x$ absorbent (18) is lean and releases the absorbed $NO_x$ when the air-fuel ratio of the exhaust gas flowing into the $NO_x$ absorbent (18) becomes the stoichiometric air-fuel ratio or rich. In the majority of the engine operation region, the lean air-fuel mixture is burned in the combustion chamber (3), and the $NO_x$ generated at this time is absorbed into the $NO_x$ absorbent (18). The air-fuel ratio of the exhaust gas flowing into the $NO_x$ absorbent (18) is periodically made the stoichiometric air-fuel ratio or rich, and the $NO_x$ absorbed in the $NO_x$ absorbent (18) is released, and simultaneously reduced.

33 Claims, 17 Drawing Sheets

U.S. PATENT DOCUMENTS

| | | |
|---|---|---|
| 4,780,447 | 10/1988 | Kim et al. . |
| 4,868,148 | 9/1989 | Henk et al. . |
| 5,041,407 | 8/1991 | Williamson et al. . |
| 5,090,200 | 2/1992 | Arai . |
| 5,116,800 | 5/1992 | Williamson et al. . |
| 5,174,111 | 12/1992 | Nomura ..................................... 60/285 |
| 5,189,876 | 3/1993 | Hirota et al. . |
| 5,207,990 | 5/1993 | Sekiya et al. . |
| 5,233,830 | 8/1993 | Takeshima ................................. 60/301 |
| 5,243,819 | 9/1993 | Woerner et al. . |
| 5,270,024 | 12/1993 | Kasahara ................................... 60/301 |
| 5,331,809 | 7/1994 | Takeshima et al. . |
| 5,343,702 | 9/1994 | Miyajima ................................... 60/301 |

5,473,887

1

EXHAUST PURIFICATION DEVICE OF INTERNAL COMBUSTION ENGINE

TECHNICAL FIELD

The present invention relates to a exhaust purification device of an internal combustion engine.

BACKGROUND ART

A diesel engine in which an engine exhaust passage is branched to a pair of exhaust branch passages for purifying $NO_x$, in which a switching valve is disposed at the branched portion of these exhaust branch passages to alternately guide the exhaust gas to one of the exhaust branch passages by a switching function of the switching valve, and in which a catalyst which can oxidize and absorb the $NO_x$ is disposed in each of the exhaust branch passages is well known (refer to Japanese Unexamined Patent Publication No. 62-106826). In this diesel engine, $NO_x$ in the exhaust gas introduced into one exhaust branch passage is oxidized and absorbed by the catalyst disposed in that exhaust branch passage. During this time, the inflow of the exhaust gas to the other exhaust branch passage is stopped and, at the same time, a gaseous reducing agent is fed into this exhaust branch passage. The $NO_x$ accumulated in the catalyst disposed in this exhaust branch passage is reduced by this reducing agent. Subsequently, after a short time, the introduction of the exhaust gas to the exhaust branch passage to which the exhaust gas had been introduced heretofore is stopped by the switching function of the switching valve, and the introduction of the exhaust gas to the exhaust branch passage to which the introduction of the exhaust gas had been stopped heretofore is started again.

However, when the introduction of the exhaust gas to a pair of exhaust branch passages is alternately stopped, the temperature of the catalyst in the exhaust branch passage on the side where the introduction of the exhaust gas was stopped is gradually lowered in the period where the introduction of the exhaust gas is stopped and is lowered to a considerably low temperature near the time when the introduction of the exhaust gas is started again. When the temperature of the catalyst becomes low in this way, there arises a problem in that the catalytic function of the catalyst is lowered, and therefore the oxidation and absorption function of $NO_x$ is not sufficiently carried out. In the period from when the introduction of the exhaust gas is started to when the catalyst temperature rises, the $NO_x$ is not absorbed by the catalyst and thus is discharged to the atmosphere.

Also, in this diesel engine, a pair of exhaust branch passages must be provided, and a switching valve becomes necessary. Therefore, the construction becomes complex. Further, the switching valve is always exposed to the high temperature exhaust gas, and therefore there arises a problem of durability of the switching valve. Also, from the viewpoint of the absorption of $NO_x$, one catalyst is always idle, and therefore there is another problem such that the entire catalyst which is provided is not effectively utilized for the absorption of $NO_x$.

DISCLOSURE OF THE INVENTION

An object of the present invention is to provide an exhaust purification device which can efficiently absorb $NO_x$ without a complex construction of the exhaust system and can release the absorbed $NO_x$ according to need.

2

According to the present invention, there is provided an exhaust purification device of an internal combustion engine wherein an $NO_x$ absorbent which absorbs the $NO_x$ when an air-fuel ratio of the exhaust gas flowing into the $NO_x$ absorbent is lean, and which releases the absorbed $NO_x$ when the oxygen concentration in the exhaust gas flowing into the $NO_x$ absorbent is lowered is disposed in an engine exhaust passage, the exhaust gas continuously flows into the $NO_x$ absorbent during the operation of the engine, and the $NO_x$ absorbed in the $NO_x$ absorbent when the exhaust gas flowing into the $NO_x$ absorbent is lean is released from the $NO_x$ absorbent when the oxygen concentration in the exhaust gas flowing into the $NO_x$ absorbent is lowered.

BEST MODE FOR CARRYING OUT THE INVENTION

Figure 1:
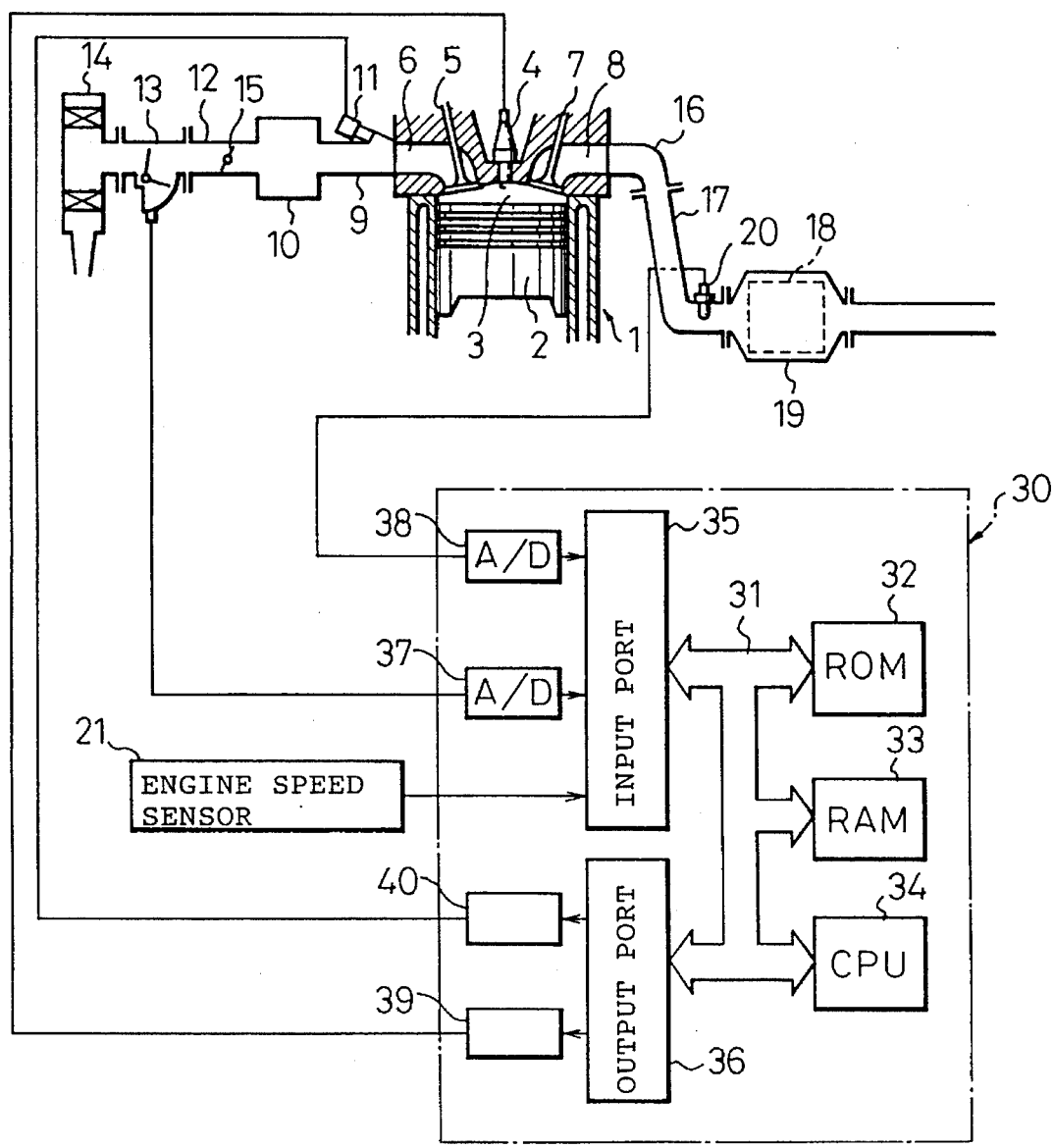
FIG. 1 is an overall view of an internal combustion engine.

FIG. 1 shows a case where the present invention is applied to a gasoline engine.

Referring to FIG. 1, 1 denotes an engine body; 2 a piston; 3 a combustion chamber; 4 a spark plug; 5 an intake valve; 6 an intake port; 7 an exhaust valve; and 8 an exhaust port, respectively. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 14 via an intake duct 12 and an air flow meter 13, and a throttle valve 15 is disposed in the intake duct 12. On the other hand, the exhaust port 8 is connected via an exhaust manifold 16 and an exhaust pipe 17 to a casing 19 including the $NO_x$ absorbent 18 therein.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. The air flow meter 13 generates an output voltage proportional to the amount of intake air, and this output voltage is input via an AD converter 37 to the input port 35. A temperature sensor 20 generating an output voltage proportional to the exhaust temperature is attached in the exhaust pipe 17 upstream of the casing 19, and the output voltage of this temperature sensor 20 is input via the AD converter 38 to the input port 35. Also, an engine speed sensor 21 generating an output pulse expressing the engine speed is connected to the input port 35. On the other hand, the output port 36 is connected via the corresponding driving circuits 39 and 40 to the spark plug 4 and fuel injector 11, respectively.

Figure 2:
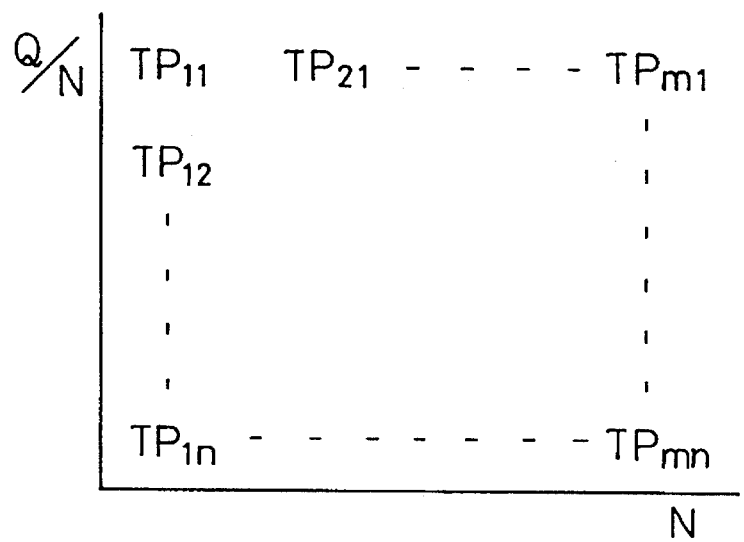
FIG. 2 is a diagram showing a map of a basic fuel injection time.

In the internal combustion engine shown in FIG. 1, the fuel injection time TAU is calculated based on for example the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiments and is stored in advance in the ROM 32 in the form of a map as shown in FIG. 2 as the function of an engine load Q/N (intake air amount Q/engine speed N) and the engine speed N. The correction coefficient K is a coefficient for controlling the air-fuel ratio of the air-fuel mixture fed into the engine cylinder, and if K=1.0, the air-fuel ratio of the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
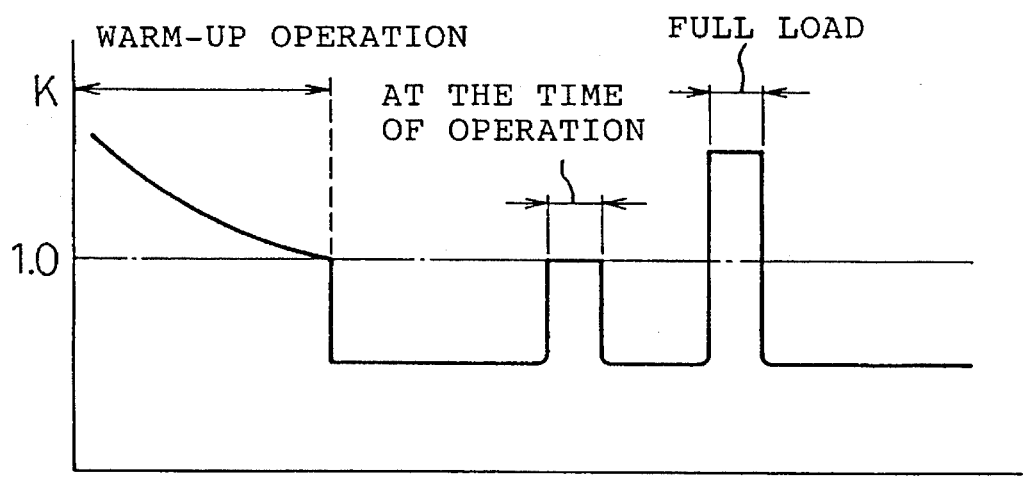
FIG. 3 is a diagram showing a change of a correction coefficient K.

This correction coefficient K is controlled in accordance with the operating state of the engine. FIG. 3 shows one embodiment of the control of this correction coefficient K. In the embodiment shown in FIG. 3, during a warm-up operation, the correction coefficient K is gradually lowered as the engine cooling water temperature becomes higher. When the warm-up is completed, the correction coefficient K is maintained at a constant value smaller than 1.0, that is, the air-fuel ratio of the air-fuel mixture fed into the engine cylinder is maintained as lean. Subsequently, when an acceleration operation is carried out, the correction coefficient K is brought to, for example, 1.0, that is, the air-fuel ratio of the air-fuel mixture fed into the engine cylinder is brought to the stoichiometric air-fuel ratio. When a full load operation is carried out, the correction coefficient K is made larger than 1.0. Namely, the air-fuel ratio of the air-fuel mixture fed into the engine cylinder is made rich. As seen from FIG. 3, in the embodiment shown in FIG. 3, except for the time of the warm-up operation, the time of the acceleration operation, and the time of the full load operation, the air-fuel ratio of the air-fuel mixture fed into the engine cylinder is maintained at a constant lean air-fuel ratio, and accordingly the lean air-fuel mixture is burned in a majority of the engine operation region.

Figure 4:
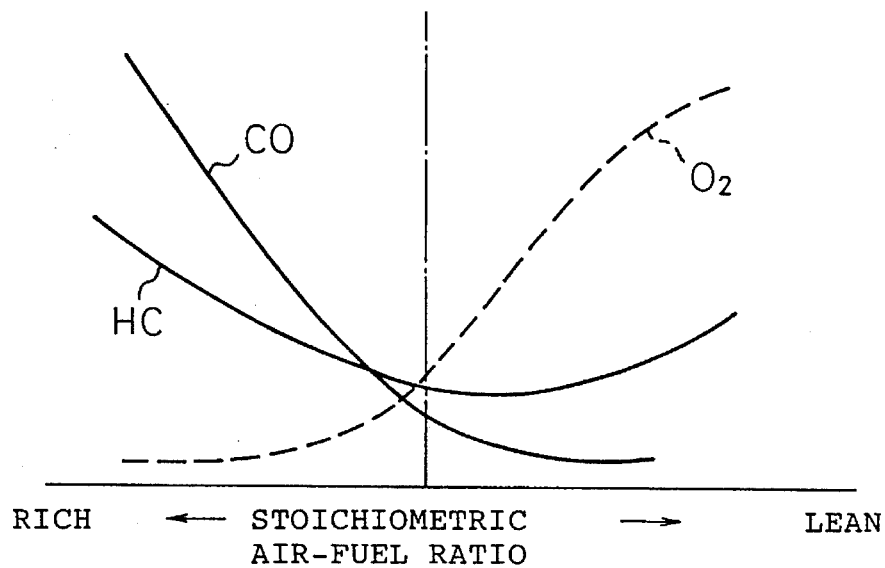
FIG. 4 is a graph schematically showing the concentration of unburnt HC and CO in the exhaust and oxygen discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 18 contained in the casing 19 uses, for example, alumina as a carrier. On this carrier, at least one substance selected from alkali metals, for example, potassium K, sodium Na, lithium Li, and cesium Cs; alkali earth metals, for example, barium Ba and calcium Ca; rare earth metals, for example, lanthanum La and yttrium Y; and precious metals such as platinum Pt, is carried. When referring to the ratio between the air and fuel (hydrocarbons) fed into the intake passage of the engine and the exhaust passage upstream of the $NO_x$ absorbent 18 as the air-fuel ratio of the exhaust gas flowing into the $NO_x$ absorbent to the $NO_x$ absorbent 18, this $NO_x$ absorbent 18 performs the absorption and releasing operation of $NO_x$ by absorbing the $NO_x$ when the air-fuel ratio of the exhaust gas flowing into the $NO_x$ absorbent is lean, while releasing the absorbed $NO_x$ when the concentration of oxygen in the exhaust gas flowing into the $NO_x$ absorbent falls. Note that, where the fuel (hydrocarbons) or air is not fed into the exhaust passage upstream of the $NO_x$ absorbent 18, the air-fuel ratio of the exhaust gas flowing into the $NO_x$ absorbent coincides with the air-fuel ratio of the air-fuel mixture fed into the combustion chamber 3, and accordingly in this case, the $NO_x$ absorbent 18 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

When the above-mentioned $NO_x$ absorbent 18 is disposed in the exhaust passage of the engine, this $NO_x$ absorbent 18 actually performs the absorption and releasing operation of $NO_x$, but there are areas of the exact mechanism of this absorption and releasing operation which are not clear. However, it can be considered that this absorption and releasing operation is conducted by the mechanism as shown in FIG. 5. This mechanism will be explained by using as an example a case where platinum Pt and barium Ba are carried on the carrier, but a similar mechanism is obtained even if another precious metal, alkali metal, alkali earth metal, or rare earth metal is used.

Figure 5A:
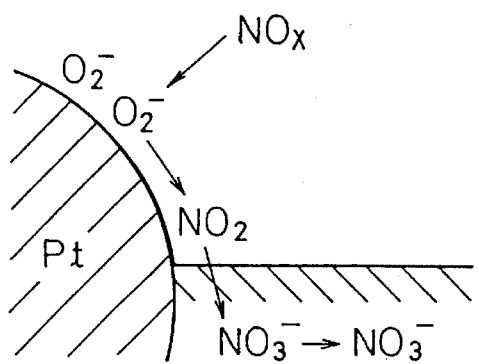
FIG. 5(a)–5(b) is a diagram for explaining an absorption and releasing operation of the $NO_x$.

Namely, when the exhaust gas flowing into the $NO_x$ absorbent becomes considerably lean, the concentration of oxygen in the exhaust gas flowing into the $NO_x$ absorbent is greatly increased. As shown in FIG. 5(A), the oxygen $O_2$ is deposited on the surface of the platinum Pt in the form of $O_2^-$. On the other hand, the NO in the exhaust gas flowing into the $NO_x$ absorbent reacts with the $O_2^-$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5(A). In this way, $NO_x$ is absorbed into the $NO_x$ absorbent 18.

So long as the oxygen concentration in the exhaust gas flowing into the $NO_x$ absorbent is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the exhaust gas flowing into the $NO_x$ absorbent is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the exhaust gas flowing into the $NO_x$ absorbent is lowered, the $NO_x$ is released from the $NO_x$ absorbent 18. As shown in FIG. 4, when the degree of leanness of the exhaust gas flowing into the $NO_x$ absorbent becomes low, the oxygen concentration in the exhaust gas flowing into the $NO_x$ absorbent is lowered, and accordingly when the degree of leanness of the exhaust gas flowing into the $NO_x$ absorbent is lowered, the $NO_x$ is released from the $NO_x$ absorbent 18 even if the air-fuel ratio of the exhaust gas flowing into the $NO_x$ absorbent is lean.

Figure 5B:
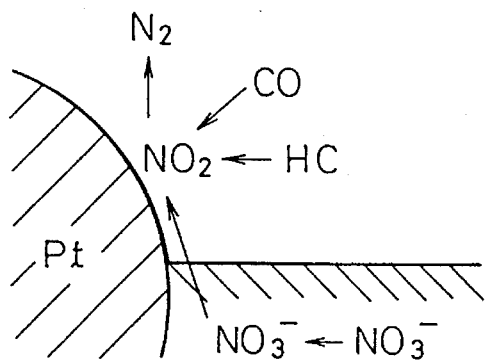

On the other hand, at this time, when the air-fuel ratio of the air-fuel mixture fed into the combustion chamber 3 is made rich and the air-fuel ratio of the exhaust gas flowing into the $NO_x$ absorbent becomes rich, as shown in FIG. 4, a large amount of unburnt HC and CO is discharged from the engine, and these unburnt HC and CO react with the oxygen $O_2^-$ on the platinum Pt and are oxidized. Also, when the air-fuel ratio of the exhaust gas flowing into the $NO_x$ absorbent becomes rich, the oxygen concentration in the exhaust gas flowing into the $NO_x$ absorbent is extremely lowered, and therefore the $NO_2$ is released from the absorbent. This $NO_2$ reacts with the unburnt HC and CO as shown in FIG. 5(B) and is reduced. In this way, when the $NO_2$ no longer exists on the surface of the platinum Pt, the $NO_2$ is successively released from the absorbent. Accordingly, when the air-fuel ratio of the exhaust gas flowing into the $NO_x$ absorbent is made rich, the $NO_x$ is released from the $NO_x$ absorbent 18 in a short time.

Namely, when the air-fuel ratio of the exhaust gas flowing into the $NO_x$ absorbent is made rich, first of all, the unburnt HC and CO immediately react with the $O_2^-$ on the platinum Pt and are oxidized, and subsequently if the unburnt HC and CO still remain even though the $O_2^-$ on the platinum Pt is consumed, the $NO_x$ released from the absorbent and the $NO_x$ discharged from the engine are reduced by these unburnt HC and CO. Accordingly, when the air-fuel ratio of the exhaust gas flowing into the $NO_x$ absorbent is made rich, the $NO_x$ absorbed in the $NO_x$ absorbent 18 is released in a short time and in addition this released $NO_x$ is reduced, and therefore the discharge of $NO_x$ into the atmosphere can be blocked. Also, since the $NO_x$ absorbent 18 has the function of a reduction catalyst, even if the air-fuel ratio of the exhaust gas flowing into the $NO_x$ absorbent is made the stoichiometric air-fuel ratio, the $NO_x$ released from the $NO_x$ absorbent 18 can be reduced. However, where the air-fuel ratio of the exhaust gas flowing into the $NO_x$ absorbent is made the stoichiometric air-fuel ratio, the $NO_x$ is released merely gradually from the $NO_x$ absorbent 18, and therefore a slightly long time is required for releasing all $NO_x$ absorbed in the $NO_x$ absorbent 18.

When the degree of leanness of the exhaust gas flowing into the $NO_x$ absorbent is lowered as mentioned before, even if the air-fuel ratio of the exhaust gas flowing into the $NO_x$ absorbent is lean, the $NO_x$ is released from the $NO_x$ absorbent 18. Accordingly, to release the $NO_x$ from the $NO_x$ absorbent 18, it is satisfactory if the concentration of oxygen in the exhaust gas flowing into the $NO_x$ absorbent is lowered. Note, even if the $NO_x$ is released from the $NO_x$ absorbent 18, when the air-fuel ratio of the exhaust gas flowing into the $NO_x$ absorbent is lean, the $NO_x$ is not reduced in the $NO_x$ absorbent 18, and accordingly, in this case, it is necessary to provide a catalyst which can reduce the $NO_x$ downstream of the $NO_x$ absorbent 18 or supply a reducing agent downstream of the $NO_x$ absorbent 18. Of course, it is also possible to reduce the $NO_x$ downstream of the $NO_x$ absorbent 18 in this way, but it is rather preferable that the $NO_x$ be reduced in the $NO_x$ absorbent 18. Accordingly, in the embodiment according to the present invention, when the $NO_x$ should be released from the $NO_x$ absorbent 18, the air-fuel ratio of the exhaust gas flowing into the $NO_x$ absorbent is made the stoichiometric air-fuel ratio or rich, whereby the $NO_x$ released from the $NO_x$ absorbent 18 is reduced in the $NO_x$ absorbent 18.

Figure 6:
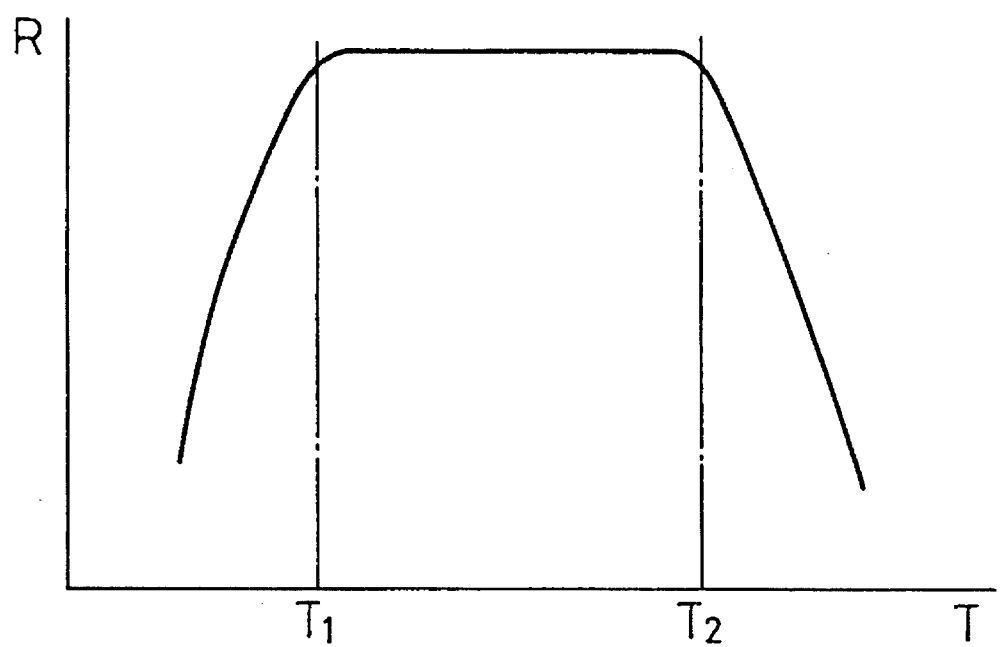
FIG. 6 is a diagram showing an absorption rate of $NO_x$.

FIG. 6 shows the absorption rate R of the $NO_x$ absorbed into the $NO_x$ absorbent 18 when the air-fuel ratio of the exhaust gas flowing into the $NO_x$ absorbent is lean. Note that, the abscissa T shows the temperature of the $NO_x$ absorbent 18. In actuality, the temperature T of the $NO_x$ absorbent 18 becomes almost equal to the temperature of the exhaust gas flowing into the $NO_x$ absorbent 18. As seen from FIG. 6, when the temperature of the $NO_x$ absorbent 18 becomes lower than about 200° C. indicated by $T_1$, the oxidation function of $NO_x$ ($2NO+O_2 \rightarrow 2NO_2$) is weakened, and therefore the $NO_x$ absorption rate R is lowered. Moreover, at this time, also the releasing operation of $NO_x$ ($NO_3^- \rightarrow NO_2$) is weakened, and therefore even if the air-fuel ratio of the exhaust gas flowing into the $NO_x$ absorbent is made the stoichiometric air-fuel ratio or rich, it becomes impossible to release the $NO_x$ from the $NO_x$ absorbent 18 well. On the other hand, when the temperature T of the $NO_x$ absorbent 18 becomes higher than about 500° C. indicated by $T_2$, the $NO_x$ absorbed in the $NO_x$ absorbent 18 is decomposed and naturally released from the $NO_x$ absorbent 18, and therefore the $NO_x$ absorption rate is lowered. Accordingly, the $NO_x$ is absorbed well into the $NO_x$ absorbent 18 when the temperature T of the $NO_x$ absorbent 18 is within the predetermined temperature range ($T_1 < T < T_2$).

As shown in FIG. 3, in the embodiment according to the present invention, the air-fuel ratio of the air-fuel mixture fed into the combustion chamber 3 is made rich at the time of the warm-up operation and at the time of the full load operation, and the air-fuel ratio is made the stoichiometric air-fuel ratio at the time of the acceleration operation, but the lean air-fuel mixture is burned in the combustion chamber 3 in the majority of the operation region other than these. In this case, the air-fuel ratio of the air-fuel mixture burned in the combustion chamber 3 is more than 18.0. In the embodiment shown in FIG. 1, a lean air-fuel mixture having an air-fuel ratio of from about 20 to 24 is burned. When the air-fuel ratio becomes more than 18.0, even if the three-way catalyst has a reduction property under a lean air-fuel ratio, it cannot sufficiently reduce the $NO_x$, and accordingly the three-way catalyst cannot be used so as to reduce the $NO_x$ under such a lean air-fuel ratio. Also, as a catalyst which can reduce the $NO_x$ even if the air-fuel ratio is more than 18.0, there is a Cu-zeolite catalyst, but this Cu-zeolite catalyst lacks heat resistance, and therefore the use of this Cu-zeolite catalyst is not preferable in practice. Accordingly, in the end, there is no method of purifying the $NO_x$ when the air-fuel ratio is more than 18.0 other than the method of using the $NO_x$ absorbent 18 which is used in the present invention.

Figure 7A:
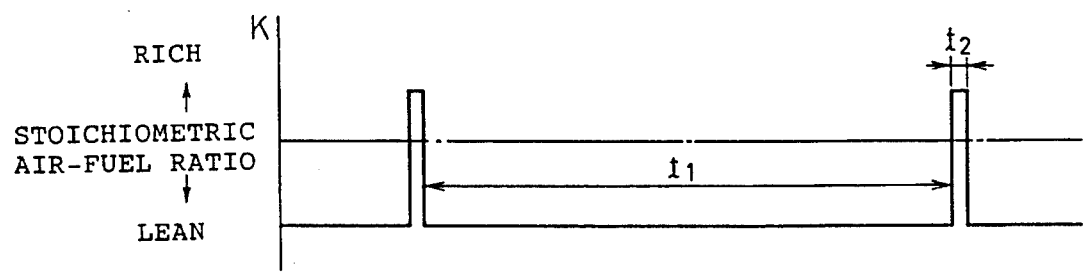
FIG. 7(A)–7(b) is a diagram showing a control of the air-fuel ratio.
Figure 7B:
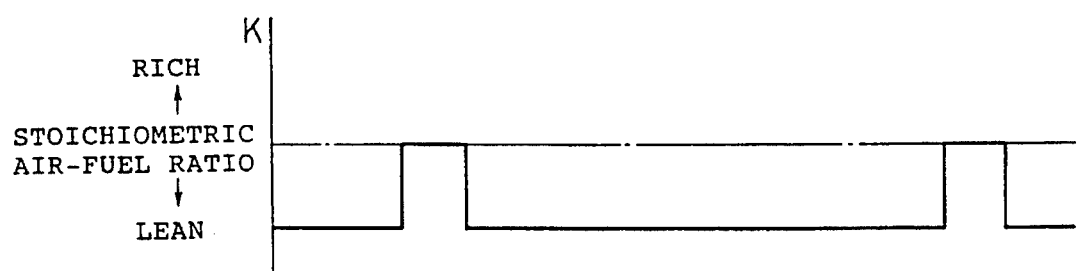
Figure 7C:
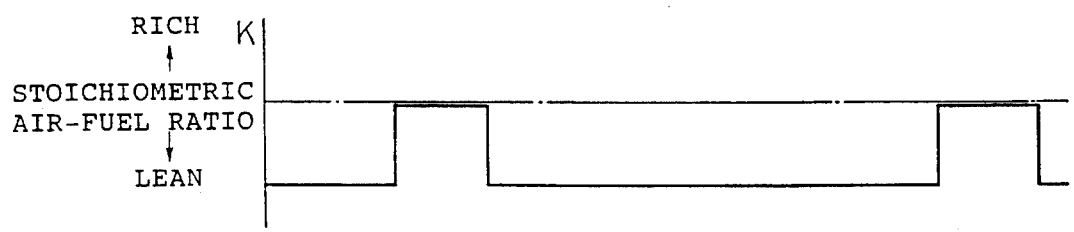

In the embodiment according to the present invention, as mentioned above, the air-fuel ratio of the air-fuel mixture fed into the combustion chamber 3 is made rich at the time of the full load operation, and that of the air-fuel mixture is made the stoichiometric air-fuel ratio at the time of the acceleration operation, and therefore $NO_x$ is released from the $NO_x$ absorbent 18 at the time of the full load operation and at the time of the acceleration operation. However, when the frequency of such a full load operation or acceleration operation is low, even if the $NO_x$ is released from the $NO_x$ absorbent 18 only at the time of the full load operation and acceleration operation, the absorption ability of the $NO_x$ by the $NO_x$ absorbent 18 is saturated during the period where the lean air-fuel mixture is burned, and thus the $NO_x$ is no longer absorbed by the $NO_x$ absorbent 18. Accordingly, in the embodiment according to the present invention, when the lean air-fuel mixture is continuously burned, as shown in FIG. 7(A), the air-fuel ratio of the exhaust gas flowing into the $NO_x$ absorbent is periodically made rich, or the air-fuel ratio of the exhaust gas flowing into the $NO_x$ absorbent is periodically made the stoichiometric air-fuel ratio as shown in FIG. 7(B). Note that, in this case, as shown in FIG. 7(C), it is also possible to periodically lower the degree of leanness, but in this case, the $NO_x$ is not reduced in the $NO_x$ absorbent 18, and therefore, as mentioned before, the $NO_x$ must be reduced downstream of the $NO_x$ absorbent 18.

As shown in FIG. 7(A), looking at the case where the air-fuel ratio of the exhaust gas flowing into the $NO_x$ absorbent is periodically made rich, a time $t_2$ over which the air-fuel ratio of the exhaust gas flowing into the $NO_x$ absorbent is made rich is much shorter than the time $t_1$ over which the combustion of the lean air-fuel mixture is carried out. Concretely speaking, while the time $t_2$ over which the air-fuel ratio of the exhaust gas flowing into the $NO_x$ absorbent is made rich is less than about 10 seconds, the time $t_1$ over which the combustion of the lean air-fuel mixture is carried out becomes a time of from 10 odd minutes to one hour or more. Namely, in other words, $t_2$ becomes 50 times or more longer than $t_1$. This is true also in the cases shown in FIGS. 7(B) and 7(C).

The releasing operation of the $NO_x$ from the $NO_x$ absorbent 18 is carried out when a constant amount of $NO_x$ is absorbed into the $NO_x$ absorbent 18, for example when $NO_x$ of 50% of the absorption ability of the $NO_x$ absorbent 18 is absorbed. The amount of $NO_x$ absorbed into the $NO_x$ absorbent 18 is proportional to the amount of the exhaust gas discharged from the engine and the $NO_x$ concentration in the exhaust gas. In this case, the amount of the exhaust gas is proportional to the intake air amount, and the $NO_x$ concentration in the exhaust gas is proportional to the engine load, and therefore the amount of $NO_x$ absorbed into the $NO_x$ absorbent 18 is proportional to the amount of intake air and the engine load. Accordingly, the amount of the $NO_x$ absorbed in the $NO_x$ absorbent 18 can be estimated from the cumulative value of the product of the amount of the intake air with the engine load, but in the embodiment according to the present invention, it is simplified and the amount of $NO_x$ absorbed in the $NO_x$ absorbent 18 is estimated from the cumulative value of the engine speed.

An explanation will be made next of one embodiment of absorption and releasing control of the $NO_x$ absorbent 18 according to the present invention with reference to FIG. 8 and FIG. 9.

Figure 8:
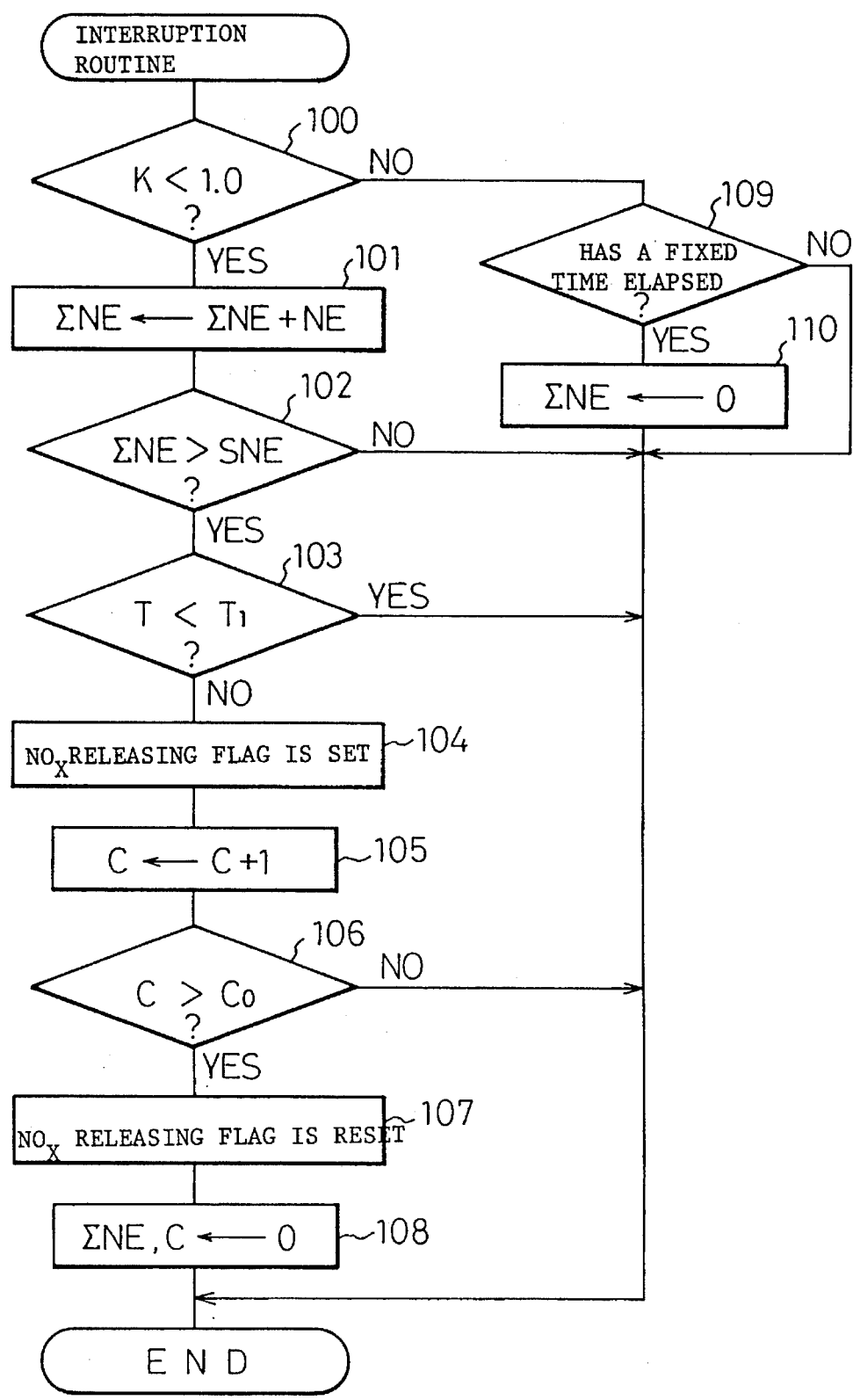
FIG. 8 is a flow chart showing an interruption routine.

FIG. 8 shows an interruption routine executed at predetermined time intervals.

Referring to FIG. 8, first, it is judged at step 100 whether or not the correction coefficient K with respect to the basic fuel injection time TP is smaller than 1.0, that is, whether or not the lean air-fuel mixture has been burned. When K<1.0, that is, when the lean air-fuel mixture has been burned, the processing routine goes to step 101, at which the result of addition of $\Sigma NE$ to the current engine speed NE is defined as $\Sigma NE$. Accordingly, this $\Sigma NE$ indicates the cumulative value of the engine speed NE. Subsequently, at step 102, it is judged whether or not the cumulative engine speed $\Sigma NE$ is larger than the constant value SNE. This constant value SNE shows a cumulative engine speed from which it is estimated that $NO_x$ in an amount of for example 50% of the absorption ability of $NO_x$ is absorbed by the $NO_x$ absorbent 18. When $\Sigma NE \leq SNE$, the processing cycle is completed, and when $\Sigma NE > SNE$, that is, when it is estimated that $NO_x$ in an amount of 50% of the $NO_x$ absorption ability of the $NO_x$ absorbent 18 is absorbed therein, the processing routine goes to step 103. At step 103, it is judged whether or not the exhaust temperature T is lower than a constant value $T_1$, for example, 200° C. When $T<T_1$, the processing cycle is completed, and when $T \geq T_1$, the processing routine goes to step 104, at which the $NO_x$ releasing flag is set. When the $NO_x$ releasing flag is set, as will be mentioned later, the air-fuel ratio of the air-fuel mixture fed into the engine cylinder is made rich.

Subsequently, at step 105, the count value C is incremented exactly by "1". Subsequently, at step 106, it is judged whether or not the count value C becomes larger than a constant value $C_0$, that is, whether or not for example five seconds have elapsed. When $C \leq C_0$, the processing routine is completed, and when C becomes larger than $C_0$, the processing routine goes to step 107, at which the $NO_x$ releasing flag is reset. When the $NO_x$ releasing flag is reset, as will be mentioned later, the air-fuel ratio of the air-fuel mixture fed into the engine cylinder is switched from rich to lean, and thus the air-fuel ratio of the air-fuel mixture fed into the engine cylinder is made rich for 5 seconds. Subsequently, at step 108, the cumulative engine speed $\Sigma NE$ and the count value C are brought to zero.

On the other hand, at step 100, when it is decided that $K \geq 1.0$, that is, when the air-fuel ratio of the air-fuel mixture fed into the engine cylinder is the stoichiometric air-fuel ratio or rich, the processing routine goes to step 109, at which it is judged whether or not the state of $K \geq 1.0$ is continued for a constant time, for example, 10 seconds. When the state of $K \geq 1.0$ is not continued for the predetermined time, the processing cycle is completed, and when the state of $K \geq 1.0$ is continued for the predetermined time, the processing routine goes to step 110, at which the cumulative engine speed $\Sigma NE$ is brought to zero.

Namely, when the time over which the air-fuel ratio of the air-fuel mixture fed into the engine cylinder is made the stoichiometric air-fuel ratio or rich is continued for about 10 seconds, it can be considered that most of the $NO_x$ absorbed in the $NO_x$ absorbent 18 was released, and accordingly in this case, the cumulative engine speed $\Sigma NE$ is brought to zero at step 110. Also, at step 103, when $T<T_1$, even if the air-fuel ratio of the air-fuel mixture fed into the engine cylinder is made rich, the temperature of the $NO_x$ absorbent 18 is low, and therefore the $NO_x$ is not released from the $NO_x$ absorbent 18. Accordingly, when $T<T_1$, the processing is delayed until T becomes equal to or larger than $T_1$, and when T becomes equal to or larger than $T_1$, the air-fuel ratio of the air-fuel mixture fed into the engine cylinder is made rich.

Figure 9:
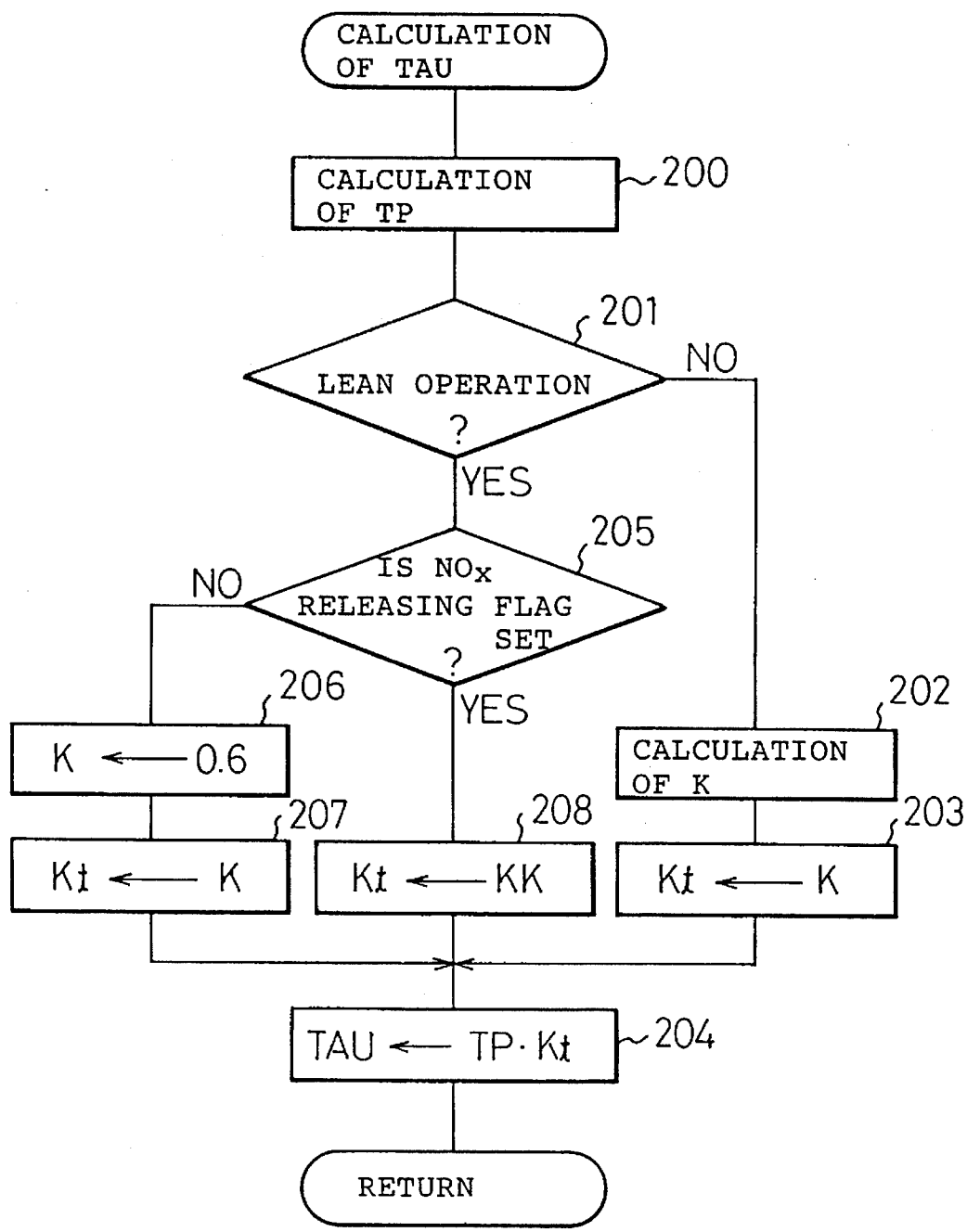
FIG. 9 is a flow chart for calculating a fuel injection time TAU.

FIG. 9 shows a calculation routine of the fuel injection time TAU. This routine is repeatedly executed.

Referring to FIG. 9, first, at step 200, a basic fuel injection time TP is calculated from a map indicated in FIG. 2.

Subsequently, at step 201, it is judged whether or not the operation state is a state where combustion of the lean air-fuel mixture should be carried out. When it is not an operation state where combustion of the lean air-fuel mixture should be carried out, that is, at the time of the warm-up operation, acceleration operation, or full load operation, the processing routine goes to step 202, at which the correction coefficient K is calculated. At the time of an engine warm-up operation, this correction coefficient K is a function of the engine cooling water temperature and becomes smaller as the engine cooling water temperature becomes higher within a range indicated by K≧1.0. Also, at the time of the acceleration operation, the correction coefficient K is brought to 1.0, and at the time of the full load operation, the correction coefficient K is made a value larger than 1.0. Subsequently, at step 203, the correction coefficient K is made Kt, and subsequently, at step 204, the fuel injection time TAU (=TP·Kt) is calculated. At this time, the air-fuel ratio of the air-fuel mixture fed into the engine cylinder is made the stoichiometric air-fuel ratio or rich.

On the other hand, at step 201, when it is judged that the operation state is a state where combustion of the lean air-fuel mixture should be carried out, the processing routine goes to step 205, at which it is judged whether or not the $NO_x$ releasing flag has been set. When the $NO_x$ releasing flag has not been set, the processing routine goes to step 206, at which the correction coefficient K is made for example 0.6, and subsequently, at step 207, the correction coefficient K is changed to Kt, and then the processing routine goes to step 204. Accordingly, at this time, a lean air-fuel mixture is fed into the engine cylinder. On the other hand, when it is decided at step 205 that the $NO_x$ releasing flag was set, the processing routine goes to step 208, at which the preliminarily determined value KK is changed to Kt, and subsequently the processing routine goes to step 204. This value KK is a value of from about 1.1 to 1.2 with which the air-fuel ratio of the air-fuel mixture fed into the engine cylinder becomes about 12.0 to 13.5. Accordingly, at this time, the rich air-fuel mixture is fed into the engine cylinder, whereby the $NO_x$ absorbed in the $NO_x$ absorbent 18 is released. Note that, at the releasing of $NO_x$, where the air-fuel mixture is to be made the stoichiometric air-fuel ratio, the value of KK is brought to 1.0.

Figure 10:
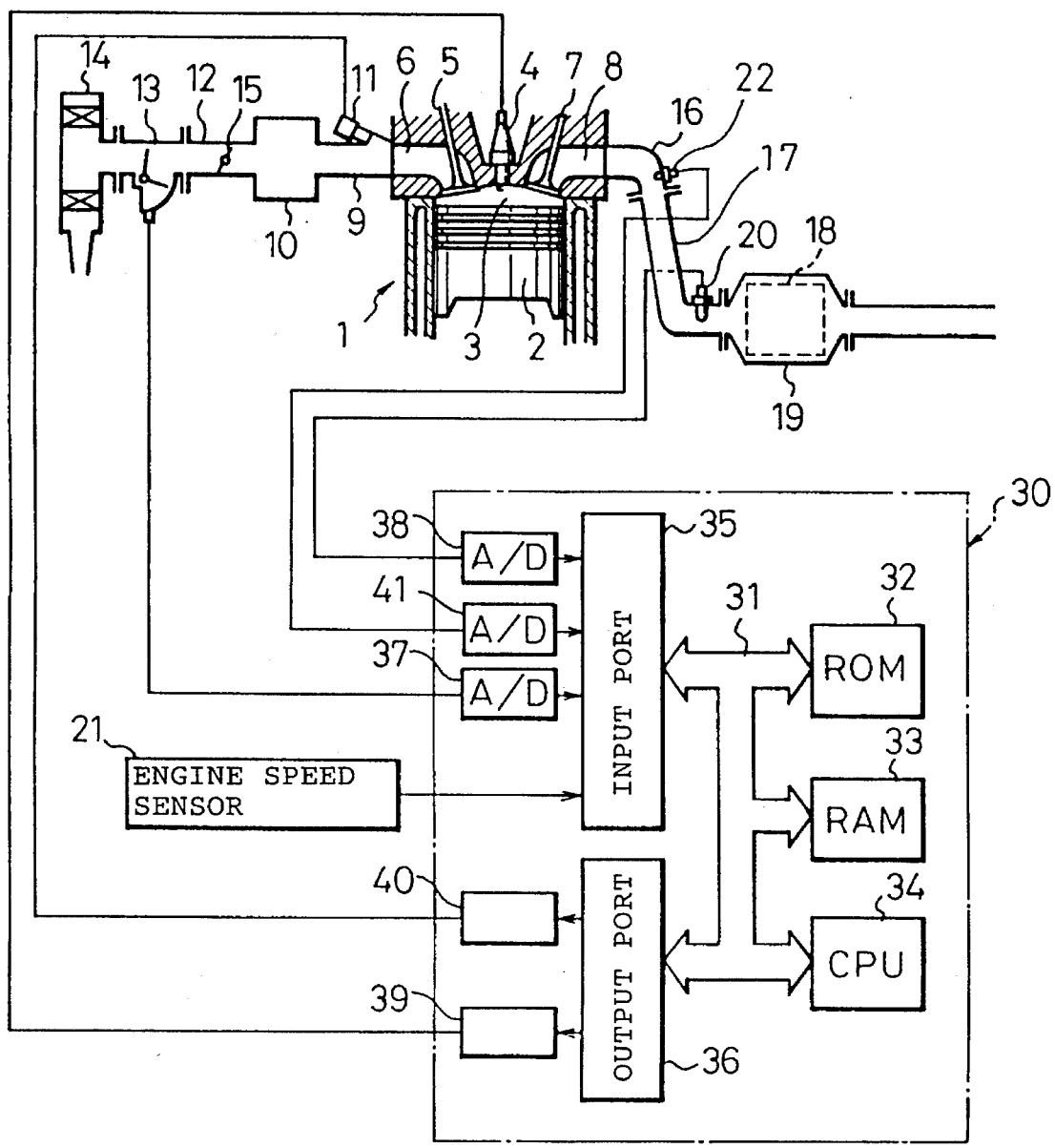
FIG. 10 is an overall view showing another embodiment of the internal combustion engine.

FIG. 10 indicates another embodiment. In this embodiment, the same constituent elements as those shown in FIG. 1 are indicated by the same reference numerals.

Figure 11:
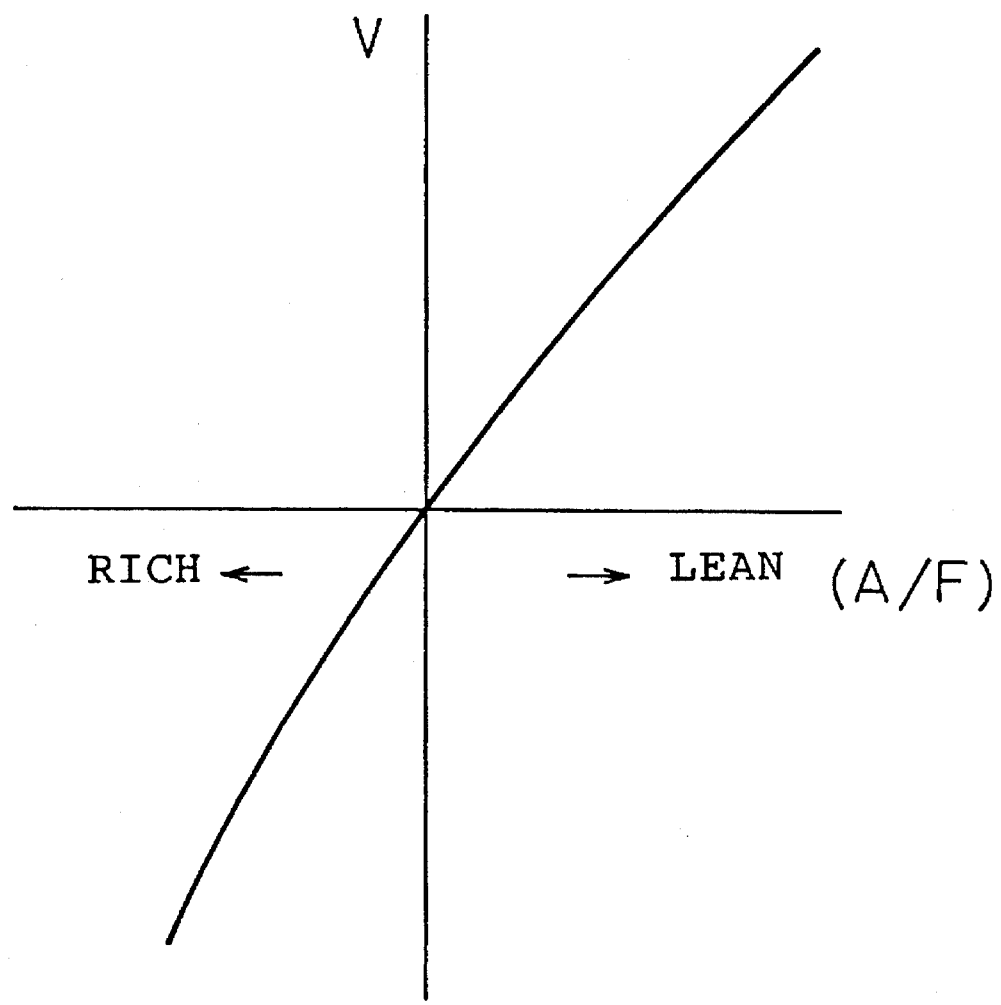
FIG. 11 is a graph showing an output of the air-fuel ratio sensor.

As shown in FIG. 10, in this embodiment, an air-fuel ratio sensor 22 which can detect the air-fuel ratio over a wide range is disposed in the exhaust manifold 16. This air-fuel ratio sensor 22 generates an output voltage V in accordance with the air-fuel ratio (A/F) as shown in FIG. 11. Accordingly, the air-fuel ratio can be learned from this output voltage V. The output voltage V is input via the AD converter 41 to the input port 35 as shown in FIG. 10.

In the embodiment indicated in FIG. 1, the value of the correction coefficient K is open loop controlled, and accordingly there is a risk that the lean air-fuel ratio at the combustion of the lean air-fuel mixture and the rich air-fuel ratio at the releasing of $NO_x$ will deviate from the regular air-fuel ratios due to aging. In the embodiment shown in FIG. 10, the air-fuel ratio is subjected to feedback control using the air-fuel ratio sensor 22, whereby these lean air-fuel ratio and rich air-fuel ratio are always brought into coincidence with the regular air-fuel ratios.

Namely, as shown in FIG. 10, where the air-fuel ratio sensor 22 is used, the fuel injection time TAU is calculated based on the following equation:

$$TAU = TP \cdot K \cdot F \cdot G$$

Here, the basic fuel injection time TP and the correction coefficient K are the same as those used in the embodiment shown in FIG. 1 to FIG. 9, and a feedback correction coefficient F and a learning coefficient G are newly added to this. This feedback correction coefficient F fluctuates so that the air-fuel ratio coincides with the target air-fuel ratio based on the output voltage V of the air-fuel ratio sensor 22, and the learning coefficient G is changed so that a fluctuation around 1.0 occurs. Note that, also in this embodiment, the routine shown in FIG. 8 is used for controlling the $NO_x$ releasing flag.

Figure 12:
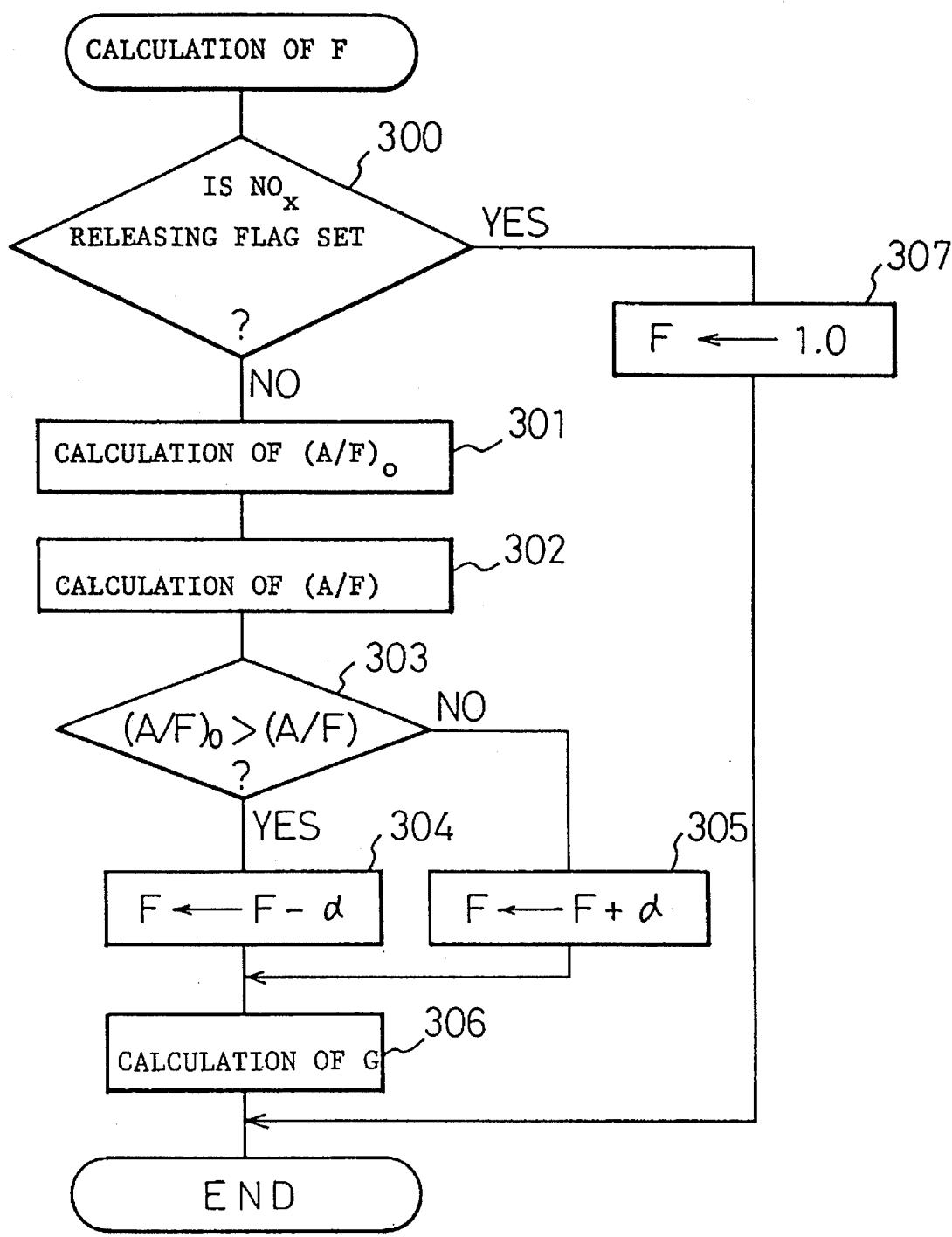
FIG. 12 is a flow chart for calculating a feedback correction coefficient F.

FIG. 12 shows a routine for calculating the feedback correction coefficient F, which routine is executed by interruption at predetermined time intervals.

Referring to FIG. 12, first of all, at step 300, it is judged whether or not the $NO_x$ releasing flag is set. When the $NO_x$ releasing flag is not set, the processing routine goes to step 301, at which a target air-fuel ratio $(A/F)_0$ corresponding to the correction coefficient K is calculated. Subsequently, at step 302, the current air-fuel ratio (A/F) is calculated from the output voltage V of the air-fuel ratio sensor 22. Subsequently, at step 303, the target air-fuel ratio $(A/F)_0$ is compared with the present air-fuel ratio (A/F). When $(A/F)_0 > (A/F)$, the processing routine goes to step 304, at which the constant value α is subtracted from the feedback correction coefficient F. As a result, the fuel injection time TAU is decreased, and therefore the air-fuel ratio becomes larger. Contrary to this, when $(A/F)_0 \leq (A/F)$, the processing routine goes to step 305, at which the constant value α is added to the feedback correction coefficient F. As a result, the fuel injection time TAU is prolonged, and therefore the air-fuel ratio becomes smaller. In this way, the air-fuel ratio (A/F) is maintained at the target air-fuel ratio $(A/F)_0$.

Subsequently, at step 306, the average value in the predetermined period of the feedback correction coefficient F is defined as the learning coefficient G. On the other hand, at step 300, when it is decided that the $NO_x$ releasing flag is set, the processing routine goes to step 307, at which the feedback correction coefficient F is fixed to 1.0.

Figure 13:
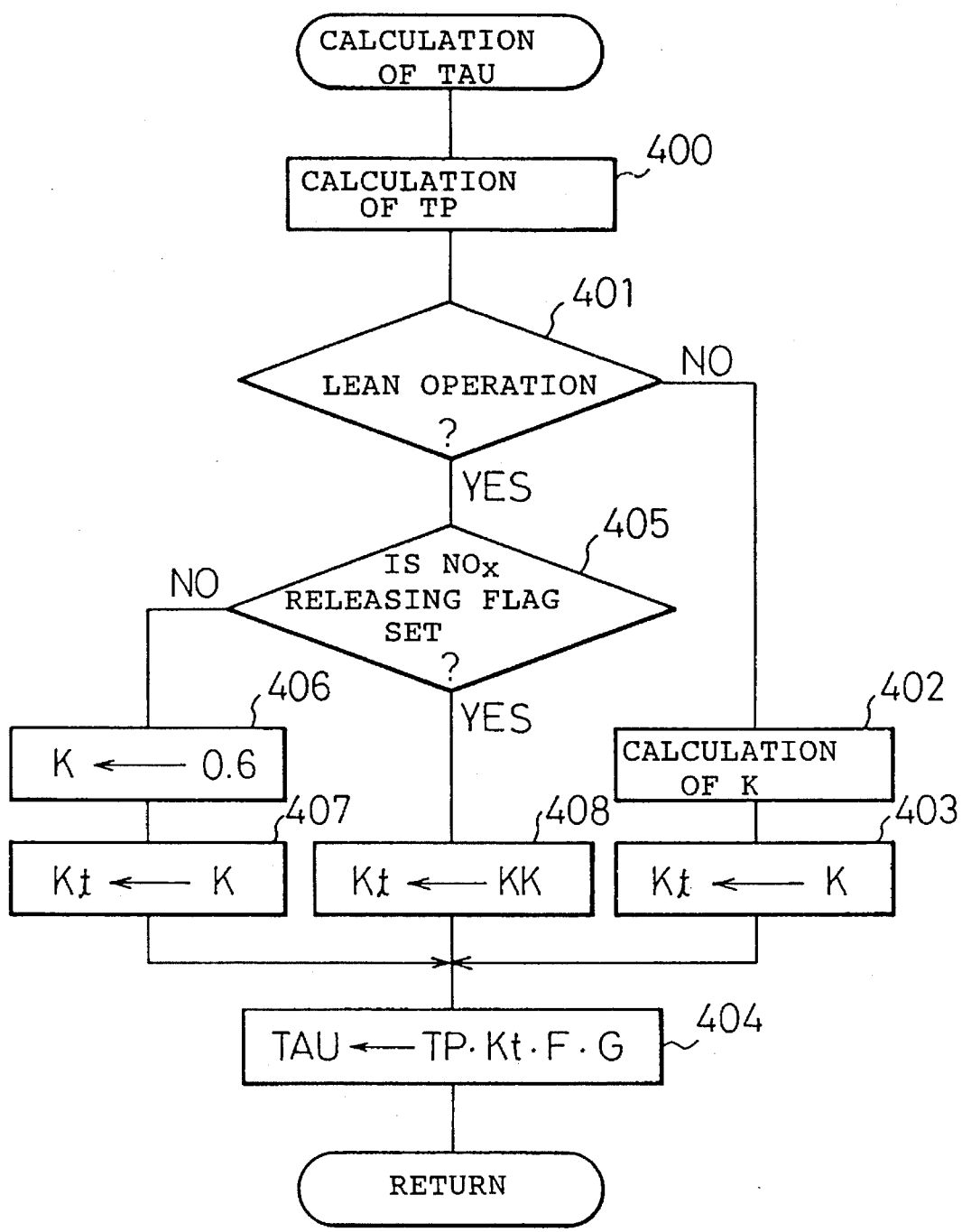
FIG. 13 is a flow chart for calculating the fuel injection time TAU.

FIG. 13 indicates a calculation routine of the fuel injection time TAU, which routine is repeatedly executed. This routine is the same as the routine shown in FIG. 9 except for step 404.

Namely, referring to FIG. 13, first of all, at step 400, the basic fuel injection time TP is calculated from the map shown in FIG. 2. Subsequently, at step 401, it is judged whether or not the operation state is a state where combustion of the lean air-fuel mixture should be carried out. When the operation state is not a state where combustion of the lean air-fuel mixture should be carried out, that is, at the time of the warm-up operation, acceleration operation, or full load operation, the processing routine goes to step 402, at which the correction coefficient K is calculated. Subsequently, at step 403, the correction coefficient K is brought to Kt, and subsequently, at step 404, the fuel injection time TAU (=TP·Kt·F·G) is calculated. At this time, the air-fuel ratio of the air-fuel mixture fed into the engine cylinder is made to have the stoichiometric air-fuel ratio or rich air-fuel ratio.

On the other hand, when it is judged at step 401 that the operation state is a state where combustion of the lean air-fuel mixture should be carried out, the processing routine goes to step 405, at which it is judged whether or not the $NO_x$ releasing flag is set. When the $NO_x$ releasing flag is not set, the processing routine goes to step 406, at which the correction coefficient K is changed to, for example, 0.6, and subsequently, after the correction coefficient K is brought to Kt at step 407, the processing routine goes to step 404. Accordingly, at this time, the lean air-fuel mixture is fed into the engine cylinder. On the other hand, when it is decided at step 405 that the $NO_x$ releasing flag was set, the processing routine goes to step 408, at which the preliminarily determined value KK is set to Kt, and subsequently, the processing routine goes to step 404. This value KK is a value of from about 1.1 to 1.2. Accordingly, at this time, a rich air-fuel mixture is fed into the engine cylinder, whereby the $NO_x$ absorbed in the $NO_x$ absorbent 18 is released.

As mentioned before, the learning coefficient G expresses an average value of the feedback correction coefficient F in the predetermined period. This feedback correction coefficient F originally fluctuates around 1.0. For example, when assuming that a deposit builds up in the nozzle port of the fuel injector 11, the feedback correction coefficient F becomes larger than 1.0 so as to maintain the air-fuel ratio (A/F) at the target air-fuel ratio $(A/F)_0$. In this way, when the feedback correction coefficient F becomes larger than 1.0, the learning coefficient G becomes larger along with this, and thus the feedback correction coefficient F always fluctuates around 1.0. Accordingly, in this case, when the feedback correction coefficient F is fixed to 1.0, the air-fuel ratio (A/F) coincides with the target air-fuel ratio $(A/F)_0$ corresponding to the correction coefficient K. In the embodiment shown in FIG. 10, as shown in FIG. 12, when the $NO_x$ releasing flag is set, the feedback correction coefficient F is fixed to 1.0. Accordingly, at this time, the air-fuel ratio of the air-fuel mixture fed into the engine cylinder is brought into a correct coincidence with the air-fuel ratio corresponding to KK.

Figure 14:
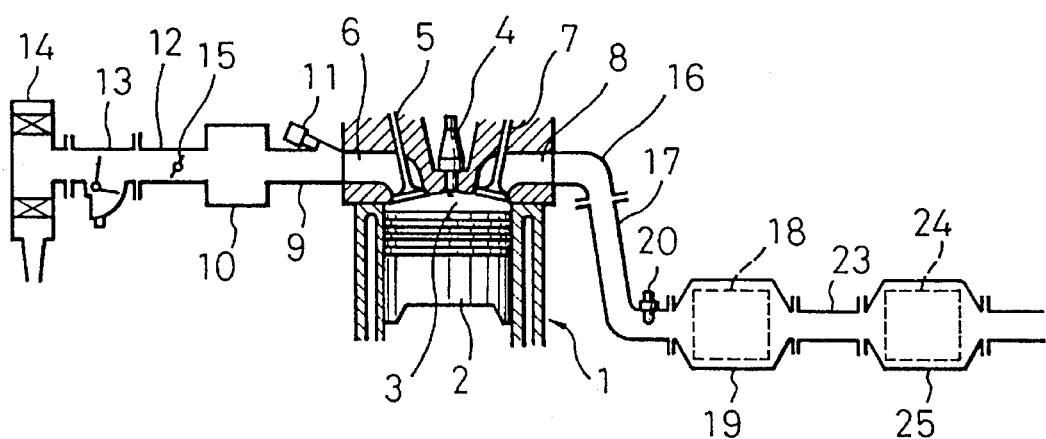
FIG. 14 is an overall view showing still another embodiment of the internal combustion engine.

FIG. 14 shows still another embodiment. In this embodiment, an output side of the casing 19 is connected via the exhaust pipe 23 with a catalytic converter 25 including a three-way catalyst 24 therein. This three-way catalyst 24 exhibits a high purification efficiency with respect to the CO, HC, and $NO_x$ when the air-fuel ratio is maintained at approximately the stoichiometric air-fuel ratio as is well known, but this three-way catalyst 24 has a high purification efficiency with respect to the $NO_x$ even when the air-fuel ratio has become rich to a certain extent. In the embodiment shown in FIG. 14, a three-way catalyst 24 is provided downstream of the $NO_x$ absorbent 18 so as to purify the $NO_x$ by utilizing this characteristic.

Namely, as mentioned before, when the air-fuel ratio of the air-fuel mixture fed into the engine cylinder is made rich so as to release the $NO_x$ from the $NO_x$ absorbent 18, the $NO_x$ absorbed in the $NO_x$ absorbent 18 is abruptly released from the $NO_x$ absorbent 18. At this time, although the $NO_x$ is reduced at the releasing, there is a possibility that all the $NO_x$ is not reduced. However, when the three-way catalyst 24 is disposed downstream of the $NO_x$ absorbent 18, the $NO_x$ which was not reduced at the releasing is reduced by the three-way catalyst 24. Accordingly, by disposing the three-way catalyst 24 downstream of the $NO_x$ absorbent 18, the $NO_x$ purification performance can be further improved.

Figure 15:
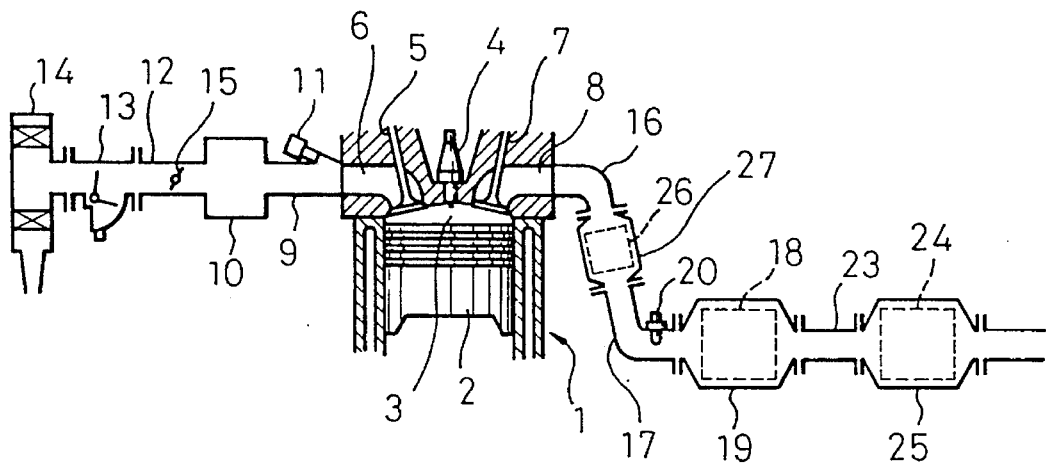
FIG. 15 is an overall view showing still another embodiment of the internal combustion engine.

FIG. 15 shows more still another embodiment. In this embodiment, still another catalytic converter 27 including a three-way catalyst 26 is disposed between the exhaust manifold 16 and the exhaust pipe 17. In this way, when the three-way catalyst 26 is disposed near the exhaust port 8, the three-way catalyst 26 is in contact with exhaust gas having a higher temperature in comparison with the $NO_x$ absorbent 18 and the three-way catalyst 24, and therefore the three-way catalyst 26 abruptly rises in its temperature after a start of the engine in comparison with the $NO_x$ absorbent 18 and the three-way catalyst 24. Accordingly, when providing such a three-way catalyst 26, it becomes possible to purify the unburnt HC and CO generated in a large amount during the engine warm-up operation by the three-way catalyst 26 from an early time after the start of the engine.

In the embodiments mentioned heretofore, as the $NO_x$ absorbent, use is made of an $NO_x$ absorbent 18 in which at least one substance selected from alkali metals, alkali earth metals, rare earth metals, and precious metals is carried on the alumina. However, it is possible to use a composite oxide of an alkali earth metal with copper, that, is a Ba—Cu—O system $NO_x$ absorbent, instead of the use of such an $NO_x$ absorbent 18. As such a composite oxide of the alkali earth metal with copper, use can be made of, for example, $MnO_2 \cdot BaCuO_2$. In this case, platinum Pt or cerium Ce can be added.

In this $MnO_2 \cdot BaCuO_2$ system $NO_x$ absorbent, the copper Cu performs the same catalytic function as that of the platinum Pt of the $NO_x$ absorbent 18 mentioned heretofore. When the air-fuel ratio is lean, the $NO_x$ is oxidized by the copper Cu ($2NO+O_2 \rightarrow 2NO_2$) and diffused in the absorbent in the form of the nitric acid ions $NO_3^-$.

On the other hand, when the air-fuel ratio is made rich, similarly the $NO_x$ is released from the absorbent, and this $NO_x$ is reduced by the catalytic function of the copper Cu. However, the $NO_x$ reduction force of the copper Cu is weaker in comparison with the $NO_x$ reduction force of the platinum Pt, and accordingly where the Ba—Cu—O system absorbent is used, an amount of $NO_x$ which is not reduced at the releasing of $NO_x$ is slightly increased in comparison with the $NO_x$ absorbent 18 mentioned heretofore. Accordingly, where the Ba—Cu—O system absorbent is used, as shown in FIG. 14 and FIG. 15, preferably the three-way catalyst 24 is disposed downstream of the absorbent.

Figure 16:
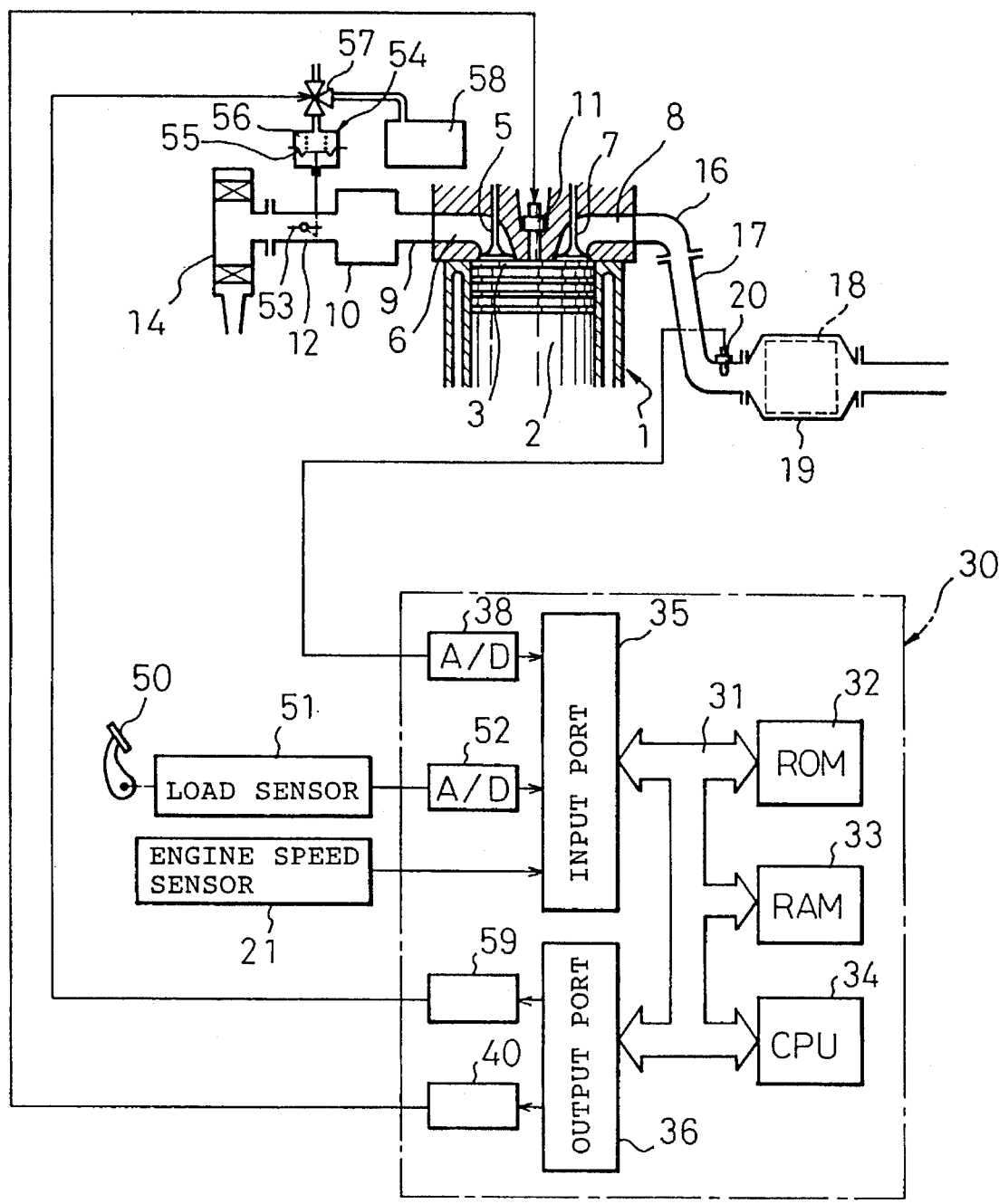
FIG. 16 is an overall view showing further still another embodiment of the internal combustion engine.
Figure 19:
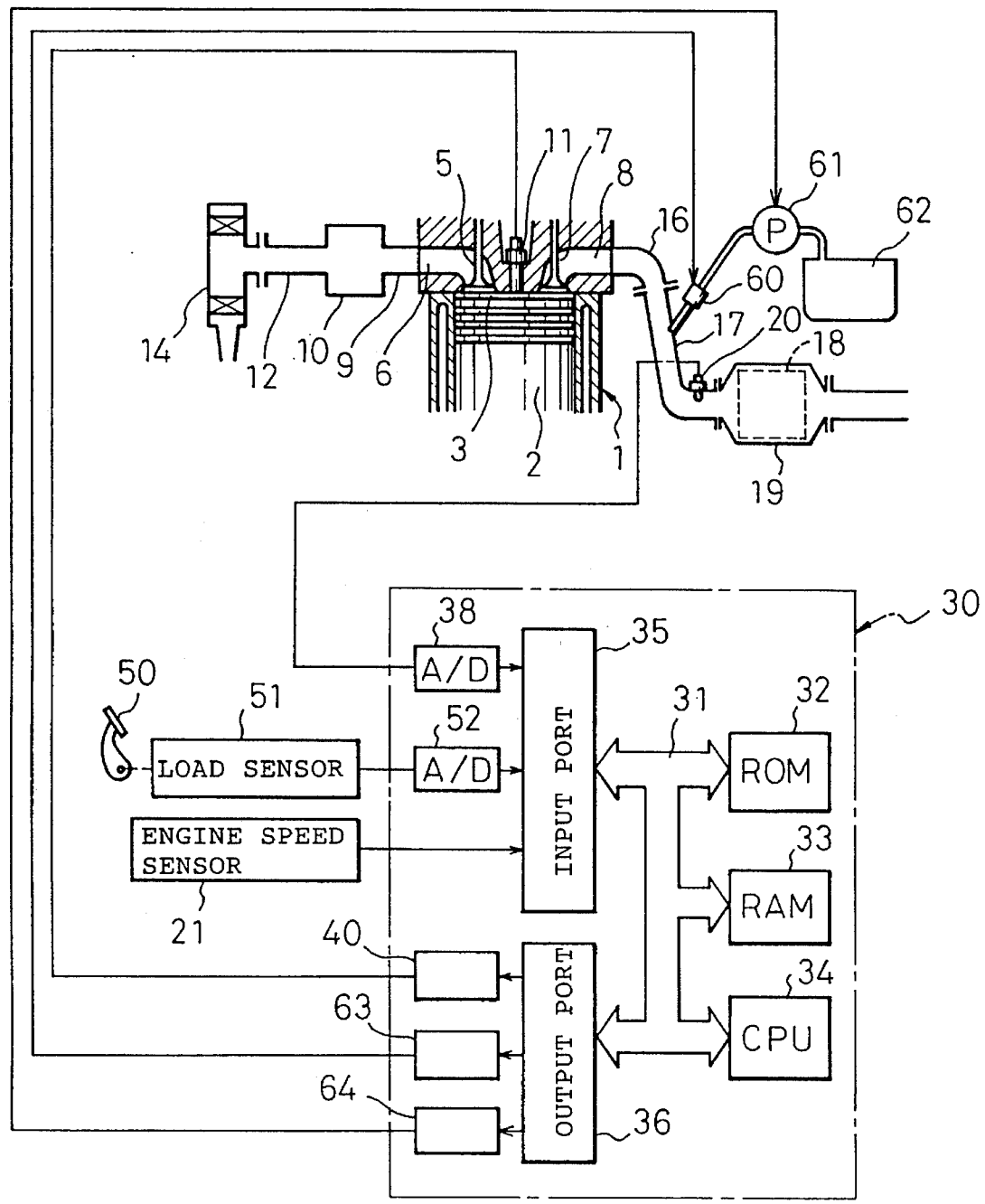
FIG. 19 is an overall view showing furthermore still another embodiment of the internal combustion engine.

FIG. 16 and FIG. 19 show a case where the present invention is applied to a diesel engine. Note that, in FIG. 16 and FIG. 19, the same constituent elements as those in FIG. 1 are shown by the same reference numerals.

In the diesel engine, usually, in all operation states, combustion is carried out in a state where the excessive air ratio is more than 1.0, that is, the average air-fuel ratio of the air-fuel mixture in the combustion chamber 3 is lean. Accordingly, the $NO_x$ discharged at this time is absorbed into the $NO_x$ absorbent 18. On the other hand, when the $NO_x$ should be released from the $NO_x$ absorbent 18, the air-fuel ratio of the exhaust gas flowing into the $NO_x$ absorbent to the $NO_x$ absorbent 18 is made rich. In this case, in the embodiment shown in FIG. 16, the average air-fuel ratio of the air-fuel mixture in the combustion chamber 3 is made rich, whereby the air-fuel ratio of the exhaust gas flowing into the $NO_x$ absorbent to the $NO_x$ absorbent 18 is made rich. In the embodiment shown in FIG. 19, the average air-fuel ratio of the air-fuel mixture in the combustion chamber 3 is made lean, and the hydrocarbon is fed into the exhaust passage of engine upstream of the $NO_x$ absorbent 18, whereby the air-fuel ratio of the exhaust gas flowing into the $NO_x$ absorbent to the $NO_x$ absorbent 18 is made rich.

Referring to FIG. 16, in this embodiment, a load sensor 51 generating an output voltage proportional to the amount of depression of the accelerator pedal 51 is provided, and the output voltage of this load sensor 51 is input via the AD converter 52 to the input port 35. Also, in this embodiment, a throttle valve 53 is disposed in the intake duct 12, which throttle valve 53 is connected to a diaphragm 55 of a vacuum diaphragm device 54. A diaphragm vacuum chamber 56 of the vacuum diaphragm device 54 is selectively connected with the atmosphere or a vacuum tank 58 via an electromagnetic switching valve 57, while the output port 36 of the electronic control unit 30 is connected to the electromagnetic switching valve 57 via a driving circuit 59. For the electromagnetic switching valve 57, a ratio between a time for which the diaphragm vacuum chamber 56 is communicated with the atmosphere and a time for which it is communicated with the vacuum tank 58, that is, the duty ratio DUTY, is controlled. As this duty ratio DUTY becomes larger, the opening degree of the throttle valve 53 becomes smaller.

In this embodiment, when the $NO_x$ should be released from the $NO_x$ absorbent 18, the amount of injection from the fuel injector 11 is increased only by a constant amount $\Delta Q$ with respect to the requested injection amount with which the best combustion is obtained, and simultaneously the throttle valve 53 is opened to the predetermined opening degree so that the average air-fuel ratio of the air-fuel mixture in the combustion chamber 3 becomes rich. Namely, when the amount of injection from the fuel injector 11 is increased by only the constant amount $\Delta Q$ with respect to the requested injection amount with which the best combustion is obtained, this increased amount worth $\Delta Q$ is not burned well and is discharged to the interior of the exhaust port 8 in the form of unburnt HC and CO. Also, at this time, the amount of air fed into the combustion chamber 3 is decreased by the opening operation of the throttle valve 53, and therefore the air-fuel ratio of the exhaust gas discharged to the interior of the exhaust port 8 become rich. Accordingly, the air-fuel ratio of the exhaust gas flowing into the $NO_x$ absorbent flowing into the $NO_x$ absorbent 18 becomes rich, and thus the $NO_x$ is released from the $NO_x$ absorbent 18. The amount $\Delta Q$ of increase of fuel and amount of opening of the throttle valve 53 when the $NO_x$ should be released from the $NO_x$ absorbent 18 are preliminarily found by experiment.

Figure 17:
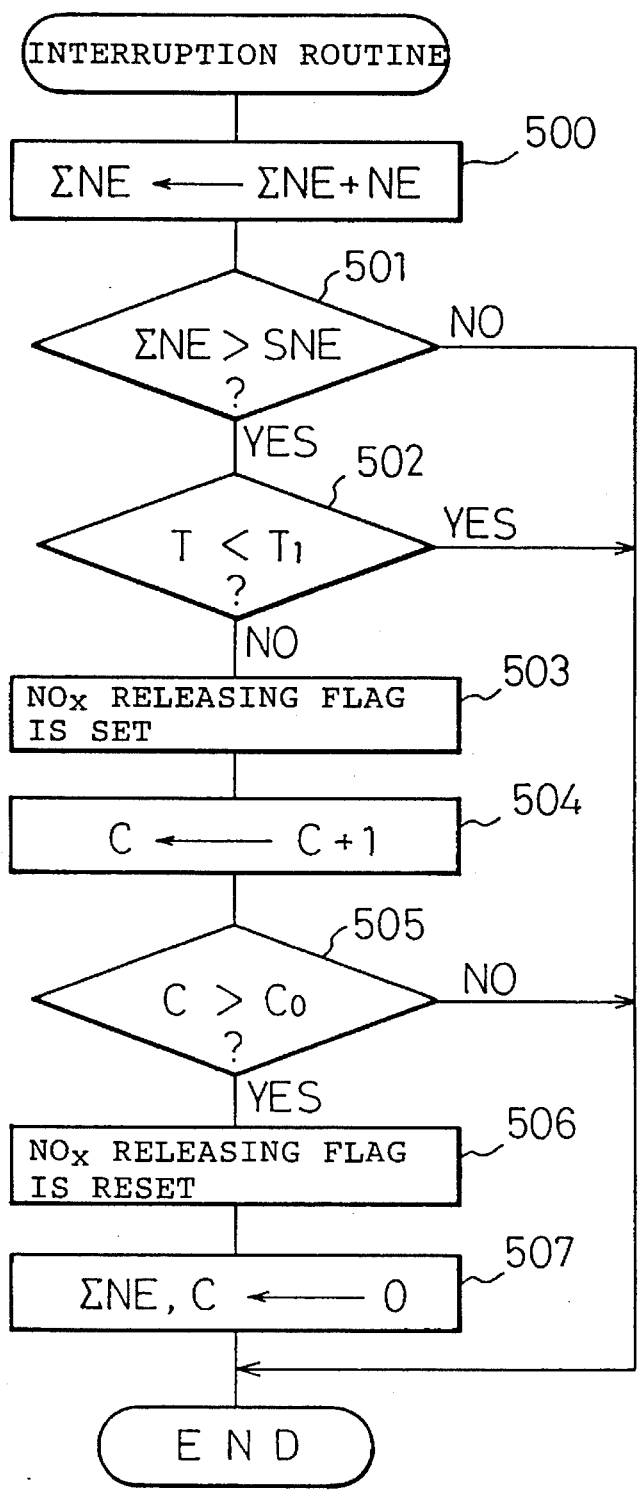
FIG. 17 is a flow chart showing an interruption routine.

FIG. 17 shows an interruption routine executed at predetermined time intervals for executing the above-mentioned control.

Referring to FIG. 17, first of all, at step 500, a result obtained by adding $\Sigma NE$ to the present engine speed NE is defined as $\Sigma NE$. Accordingly, this $\Sigma NE$ indicates the cumulative value of the engine speed NE. Subsequently, at step 501, it is judged whether or not the cumulative engine speed $\Sigma NE$ is larger than the predetermined value SNE. This predetermined value SNE indicates the cumulative engine speed from which it is estimated that the $NO_x$ in an amount of for example 50% of the $NO_x$ absorption ability of the $NO_x$ absorbent 18 is absorbed therein. When $\Sigma NE \leq SNE$, the processing cycle is completed, and when $\Sigma NE > SNE$, that is, when it is estimated that the $NO_x$ in an amount of 50% of the $NO_x$ absorption ability of the $NO_x$ absorbent 18 is absorbed therein, the processing routine goes to step 502. At step 502, it is judged whether or not the exhaust temperature T is lower than the predetermined value $T_1$, for example, 200° C. When $T < T_1$, the processing cycle is completed, and when $T \geq T_1$, the processing routine goes to step 503, at which the $NO_x$ releasing flag is set. When the $NO_x$ releasing flag is set, as will be mentioned later, the fuel injection amount is increased, and the throttle valve 53 is opened to the constant opening degree.

Subsequently, at step 504, the count value C is incremented exactly by "1". Subsequently, at step 505, it is judged whether or not the count value C becomes larger than the predetermined value $C_0$, that is, whether or not for example 5 seconds elapsed. When $C \leq C_0$, the processing routine is completed, and when C becomes larger than $C_0$, the processing routine goes to step 506, at which the $NO_x$ releasing flag is reset. When the $NO_x$ releasing flag is reset, as will be mentioned later, the increasing operation of the fuel injection amount is stopped, and the throttle valve 53 is fully opened. Accordingly, the air-fuel ratio of the exhaust gas flowing into the $NO_x$ absorbent 18 is made rich for 5 seconds. Subsequently, at step 507, the cumulative engine speed $\Sigma NE$ and the count value C are brought to zero.

Figure 18:
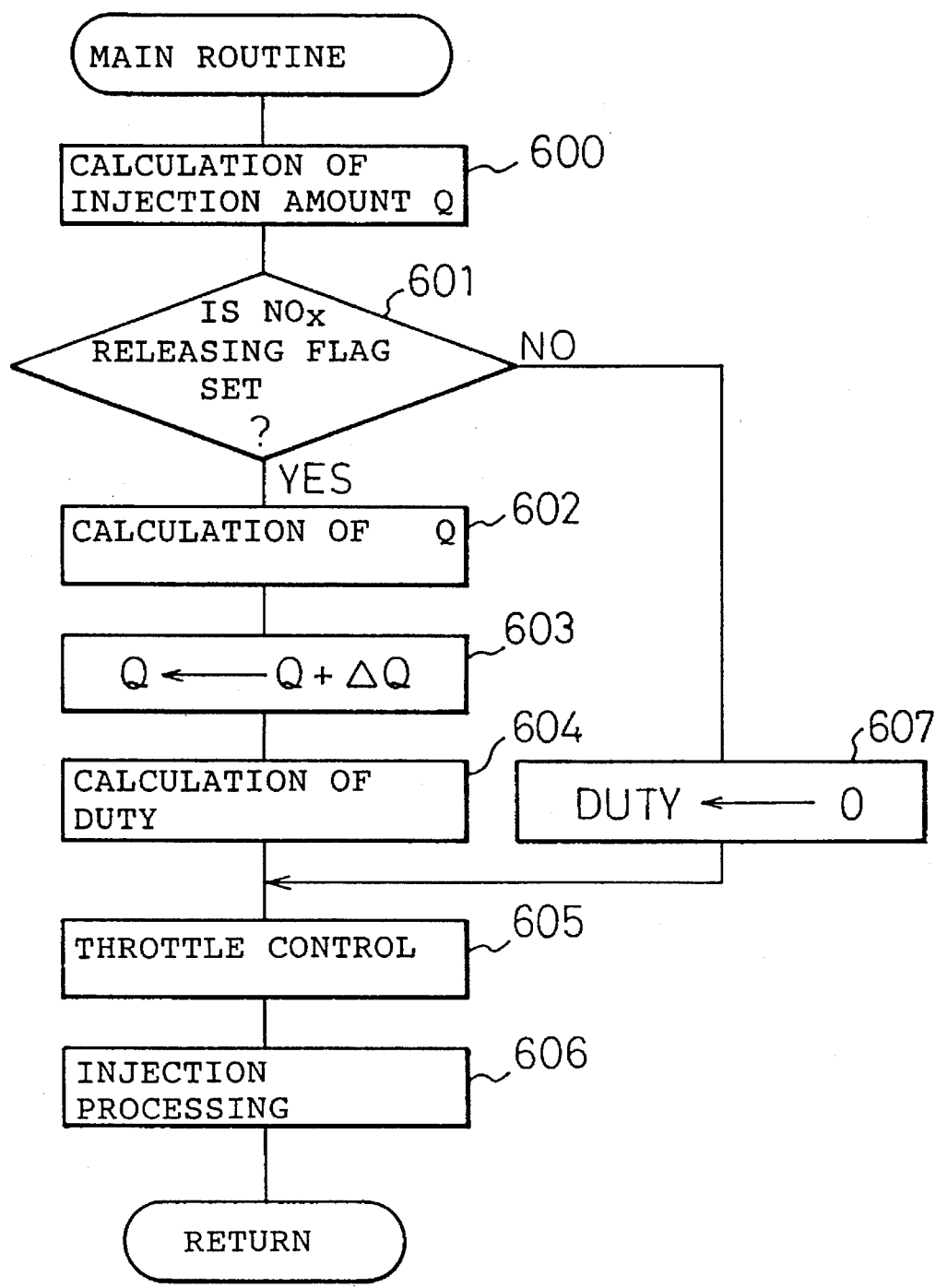
FIG. 18 is a flow chart showing a main routine.

FIG. 18 shows a main routine.

Referring to FIG. 18, first of all, at step 600, the fuel injection amount Q is calculated based on the output signals from the engine speed sensor 21 and the load sensor 51. Subsequently, it is judged at step 601 whether or not the $NO_x$ releasing flag has been set. When the $NO_x$ releasing flag has not been set, the processing routine goes to step 607, at which the duty ratio DUTY is brought to zero, and subsequently the processing routine goes to step 605, at which the control of the throttle valve 53 is carried out. At this time, the duty ratio DUTY is zero, and therefore the throttle valve 53 is retained at the fully open state. Subsequently, at step 606, the fuel injection processing is carried out, and the injection amount at this time becomes the injection amount Q calculated at step 600.

On the other hand, when it is decided at step 601 that the $NO_x$ releasing flag has been set, the processing routine goes to step 602, at which the injection amount increase value $\Delta Q$ is calculated. Subsequently, at step 603, the increase value $\Delta Q$ is added to the injection amount Q, to obtain a new injection amount Q. Subsequently, at step 604, the duty ratio DUTY is calculated. Subsequently, at step 605, the throttle valve 53 is opened to the opening degree determined by the duty ratio DUTY, and subsequently, at step 606, the fuel is injected from the fuel injector 11 according to the injection amount Q calculated at step 603.

In the embodiment shown in FIG. 19, a reducing agent supply valve 60 is disposed in the exhaust pipe 17, which this reducing agent supply valve 60 is connected with a reducing agent tank 62 via a supply pump 61. The output port 36 of the electronic control unit 30 is connected to the reducing agent supply valve 60 and the supply pump 61 via the driving circuits 63 and 64, respectively. In the reducing agent tank 62, a hydrocarbon such as gasoline, isoctane, hexane, heptane, light oil, kerosine, or the like or a hydrocarbon such as butane, propane, or the like which can be stored in the state of a liquid is filled.

In this embodiment, usually the air-fuel mixture in the combustion chamber 3 is burned under an excess air state, that is, in a state where the average air-fuel ratio is lean. At this time, the $NO_x$ discharged from the engine is absorbed into the $NO_x$ absorbent 18. When the $NO_x$ should be released from the $NO_x$ absorbent 18, the supply pump 61 is driven and, at the same time, the reducing agent supply valve 60 is opened, whereby the hydrocarbon filled in the reducing agent tank 62 is supplied from the reducing agent supply valve 60 to the exhaust pipe 17 for a predetermined time, for example, about 5 seconds to 20 seconds. The amount of supply of the hydrocarbon at this time is determined so that the air-fuel ratio of the exhaust gas flowing into the $NO_x$ absorbent flowing into the $NO_x$ absorbent 18 becomes rich. Accordingly, at this time, the $NO_x$ is released from the $NO_x$ absorbent 18.

Figure 20:
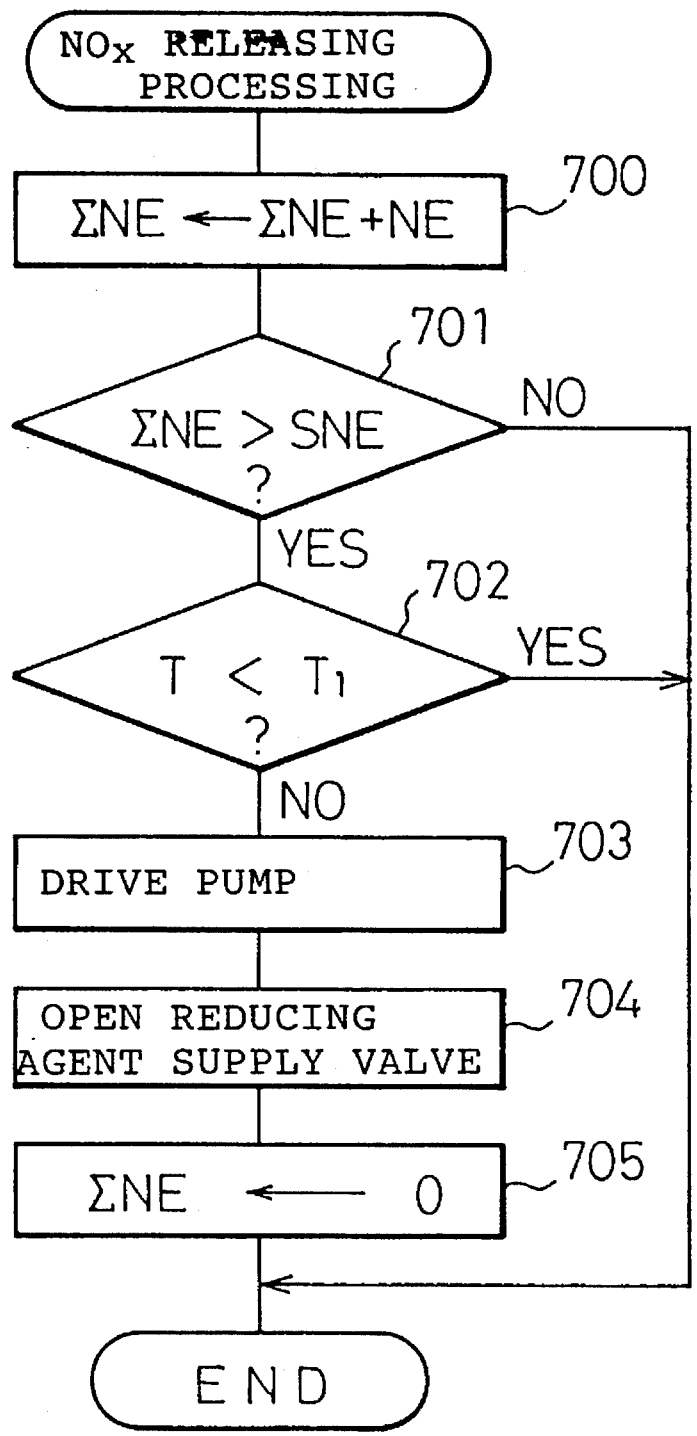
FIG. 20 is a flow chart for performing the $NO_x$ releasing processing.

FIG. 20 shows a routine for executing the $NO_x$ releasing processing, which routine is executed by interruption at every predetermined time interval.

Referring to FIG. 20, first of all, at step 700, a result obtained by adding $\Sigma NE$ to the present engine speed NE is defined as $\Sigma NE$. Accordingly, this $\Sigma NE$ indicates the cumulative value of the engine speed NE. Subsequently, at step 701, it is judged whether or not the cumulative engine speed ΣNE is larger than the predetermined value SNE. This predetermined value SNE indicates a cumulative engine speed from which it is estimated that the $NO_x$ in an amount of, for example, 50% of the $NO_x$ absorption ability of the $NO_x$ absorbent 18 is absorbed therein. When ΣNE≦SNE, the processing cycle is completed, and when ΣNE>SNE, that is, when it is estimated that the $NO_x$ in an amount of 50% of the $NO_x$ absorption ability of the $NO_x$ absorbent 18 is absorbed therein, the processing routine goes to step 702. At step 702, it is judged whether or not the exhaust temperature T is lower than the predetermined value $T_1$, for example, 200° C. When $T<T_1$, the processing cycle is completed, and when $T≧T_1$, the processing routine goes to step 703, at which the supply pump 61 is driven for a predetermined time, for example, about 5 seconds to 20 seconds. Subsequently, at step 704, the reducing agent supply valve 60 is opened for a predetermined time, for example, about 5 seconds to 20 seconds, and subsequently, at step 705, the cumulative engine speed ΣNE is brought to zero.

As mentioned before, when the temperature is lowered, the $NO_x$ absorbent 18 becomes not able to absorb the $NO_x$. However, in all of the embodiments mentioned heretofore, the exhaust gas is always flows into the $NO_x$ absorbent 18 during the operation of the engine, and therefore the $NO_x$ absorbent 18 is retained at a relatively high temperature. Accordingly, it becomes possible to cause the $NO_x$ generated during the engine operation to be absorbed in the $NO_x$ absorbent 18 well.

We claim:

1. An exhaust purification device of an internal combustion engine including an exhaust passage and means for controlling an air-fuel ratio of exhaust gas from the engine, comprising an $NO_x$ absorbent disposed within the exhaust passage, wherein the $NO_x$ absorbent absorbs $NO_x$ included in the exhaust flowing into the $NO_x$ absorbent when the air-fuel ratio control means makes the air-fuel ratio of the exhaust gas flowing into the $NO_x$ absorbent lean and releases an absorbed $NO_x$ when an oxygen concentration in the exhaust gas flowing into the $NO_x$ absorbent is lowered, and wherein, at all times while the engine is running, the exhaust gas continuously flows into the $NO_x$ absorbent so that the $NO_x$ absorbed in the $NO_x$ absorbent while the air-fuel ratio of the exhaust gas flowing into the $NO_x$ absorbent is lean is released from the $NO_x$ absorbent when the oxygen concentration of the exhaust gas flowing into the $NO_x$ absorbent is lowered.

2. An exhaust purification device of an internal combustion engine according to claim 1, wherein the air-fuel ratio control means operates to release $NO_x$ absorbed in the $NO_x$ absorbent by making the air-fuel ratio of the exhaust gas flowing into the $NO_x$ absorbent rich.

3. An exhaust purification device of an internal combustion engine according to claim 1, wherein the air-fuel ratio control means operates to release $NO_x$ absorbed in the $NO_x$ absorbent by making the air-fuel ratio of the exhaust gas flowing into the $NO_x$ absorbent substantially the stoichiometric air-fuel ratio.

4. An exhaust purification device of an internal combustion engine according to claim 1, wherein the air-fuel ratio control means maintains the air-fuel ratio of the exhaust gas flowing into the $NO_x$ absorbent lean for a first predetermined time and decreases the oxygen concentration in the exhaust gas flowing into the $NO_x$ absorbent for a second predetermined time so as to release the $NO_x$ from the $NO_x$ absorbent, wherein the first predetermined time is at least 50 times as long as the second predetermined time.

5. An exhaust purification device of an internal combustion engine according to claim 1, wherein $NO_x$ is absorbed into the $NO_x$ absorbent when the air-fuel ratio of the exhaust gas flowing into the $NO_x$ absorbent is more than 18.0.

6. An exhaust purification device of an internal combustion engine according to claim 1, wherein the $NO_x$ absorbent contains at least one substance selected from alkali metals comprising potassium, sodium, lithium, or cesium, alkali earth metals comprising barium or calcium, rare earth metals comprising lanthanum and yttrium and contains platinum.

7. An exhaust purification device of an internal combustion engine according to claim 1, wherein the $NO_x$ absorbent comprises a composite oxide of barium and copper.

8. An exhaust purification device of an internal combustion engine according to claim 1, wherein the air-fuel ratio control means controls the air-fuel ratio of an air-fuel mixture formed in an engine combustion chamber so that the absorption of $NO_x$ into the $NO_x$ absorbent and the release of $NO_x$ from the $NO_x$ absorbent are controlled by controlling the air-fuel ratio of the air-fuel mixture formed in the engine combustion chamber.

9. An exhaust purification device of an internal combustion engine according to claim 8, wherein said air-fuel ratio control means makes the air-fuel ratio of the air-fuel mixture formed in the combustion chamber lean when the $NO_x$ should be absorbed into the $NO_x$ absorbent and makes the air-fuel ratio of the air-fuel mixture formed in the combustion chamber is not lean when the $NO_x$ should be released from the $NO_x$ absorbent.

10. An exhaust purification device of an internal combustion engine according to claim 9, wherein the internal combustion engine comprises a gasoline engine and said air-fuel ratio control means controls the absorption of $NO_x$ into the $NO_x$ absorbent and the releasing of $NO_x$ from the $NO_x$ absorbent by controlling the fuel amount supplied to the engine.

11. An exhaust purification device of an internal combustion engine according to claim 10, wherein said air-fuel ratio control means maintains the air-fuel ratio of the air-fuel mixture formed in the combustion chamber at almost a constant lean air-fuel ratio of more than 18.0 when the $NO_x$ should be absorbed into the $NO_x$ absorbent.

12. An exhaust purification device of an internal combustion engine according to claim 10, further comprising memory means which stores in advance the amount of fuel determined in accordance with the operation state of the engine, said air-fuel ratio control means determines the amount of fuel supplied to the engine based on the fuel amount stored in said memory means.

13. An exhaust purification device of an internal combustion engine according to claim 10, further comprising memory means which stores in advance the basic fuel amount determined in accordance with the operation state of the engine and an air-fuel ratio sensor which is provided in the exhaust passage of the engine and detects the air-fuel ratio of the exhaust gas flowing in the exhaust passage, said air-fuel ratio control means corrects the basic fuel amount so that the air-fuel ratio of the exhaust gas becomes the target air-fuel ratio by a feedback correction coefficient varied in accordance with the output signal of said air-fuel ratio sensor.

14. An exhaust purification device of an internal combustion engine according to claim 13, wherein said air-fuel ratio control means corrects the basic fuel amount so that the air-fuel ratio of the exhaust gas becomes the target air-fuel ratio by the feedback correction coefficient when the $NO_x$ should be absorbed into the $NO_x$ absorbent and, at the same time, corrects said feedback correction coefficient by a learning coefficient so that said feedback correction coefficient fluctuates around a reference value, and said air-fuel ratio control means fixes the feedback correction value to said reference value when the $NO_x$ should be released from the $NO_x$ absorbent and, at the same time, determines the amount of fuel to be supplied to the engine based on the learning coefficient and the basic fuel amount.

15. An exhaust purification device of an internal combustion engine according to claim 9, wherein the internal combustion engine comprises a diesel engine equipped with a fuel injector which injects the fuel into the combustion chamber and a throttle valve disposed in the intake passage of the engine; and said air-fuel ratio control means controls the absorption of $NO_x$ into the $NO_x$ absorbent and the releasing of $NO_x$ from the $NO_x$ absorbent by controlling the amount of injection from the fuel injector and the opening degree of throttle valve.

16. An exhaust purification device of an internal combustion engine according to claim 15, wherein said air-fuel ratio control means increases the injection amount and decreases the throttle valve opening degree when the $NO_x$ should be released from the $NO_x$ absorbent.

17. An exhaust purification device of an internal combustion engine according to claim 1, further comprising air-fuel ratio control means which controls the air-fuel ratio of the exhaust gas discharged from the engine combustion chamber and flowing into the $NO_x$ absorbent in the exhaust passage of the engine, and the absorption of $NO_x$ into the $NO_x$ absorbent and the releasing of $NO_x$ from the $NO_x$ absorbent are controlled by controlling the air-fuel ratio of the exhaust gas flowing into the $NO_x$ absorbent by said air-fuel ratio control means.

18. An exhaust purification device of an internal combustion engine according to claim 17, wherein said air-fuel ratio control means makes the air-fuel ratio of the exhaust gas flowing into the $NO_x$ absorbent lean when the $NO_x$ should be absorbed into the $NO_x$ absorbent, while makes the air-fuel ratio of the exhaust gas flowing into the $NO_x$ absorbent the stoichiometric air-fuel ratio or rich when the $NO_x$ should be released from the $NO_x$ absorbent.

19. An exhaust purification device of an internal combustion engine according to claim 18, wherein said air-fuel ratio control means supplies a reducing agent to the interior of the exhaust passage of the engine when the $NO_x$ should be released from the $NO_x$ absorbent.

20. An exhaust purification device of an internal combustion engine according to claim 19, wherein said reducing agent is made of a hydrocarbon.

21. An exhaust purification device of an internal combustion engine according to claim 20, wherein said hydrocarbon comprises at least one member selected from gasoline, isoctane, hexane, heptane, butane, propane, light oil, and kerosine.

22. An exhaust purification device of an internal combustion engine according to claim 1, wherein the air-fuel ratio control means lowers the oxygen concentration in the exhaust gas flowing into the $NO_x$ absorbent during a first predetermined set-up period of time so as to release the $NO_x$ from the absorbent when a period of time during which the air-fuel ratio of the exhaust gas flowing into the $NO_x$ absorbent has previously been made lean and, during which $NO_x$ has been absorbed into the $NO_x$ absorbent, exceeds a predetermined second set-up period of time.

23. An exhaust purification device of an internal combustion engine according to claim 22, wherein said $NO_x$ releasing control means makes the air-fuel ratio of the exhaust gas flowing into the $NO_x$ absorbent the stoichiometric air-fuel ratio or rich when the $NO_x$ should be released from the $NO_x$ absorbent.

24. An exhaust purification device of an internal combustion engine according to claim 22, wherein the $NO_x$ releasing control means is provided with $NO_x$ amount estimation means for estimating the amount of $NO_x$ absorbed into the $NO_x$ absorbent, and said $NO_x$ releasing control means decides that said second set-up period has elapsed when the amount of $NO_x$ estimated by the $NO_x$ amount estimation means exceeds a preliminarily determined set-up amount.

25. An exhaust purification device of an internal combustion engine according to claim 24, wherein said $NO_x$ amount estimation means decides that the amount of $NO_x$ absorbed in the $NO_x$ absorbent exceeds said set-up amount when a cumulative value of an engine speed exceeds a preliminarily determined set-up value.

26. An exhaust purification device of an internal combustion engine according to claim 24, wherein said $NO_x$ amount estimation means decides that substantially all of the $NO_x$ absorbed in the $NO_x$ absorbent has released when the air-fuel ratio of the air-fuel mixture formed in the engine combustion chamber is not lean for a predetermined time or more.

27. An exhaust purification device of an internal combustion engine according to claim 22, wherein said second set-up period is substantially less than 20 seconds.

28. An exhaust purification device of an internal combustion engine according to claim 22, wherein said $NO_x$ releasing control means is provided with a temperature sensor for detecting a temperature of the exhaust gas flowing into the $NO_x$ absorbent, and said $NO_x$ releasing control means is provided with prohibition means which prohibits the lowering of the oxygen concentration in the exhaust gas flowing into the $NO_x$ absorbent even if the period for which the $NO_x$ is absorbed into the $NO_x$ absorbent exceeds said first set-up period when the temperature of the exhaust gas flowing into the $NO_x$ absorbent becomes lower than a limit temperature at which the $NO_x$ can be absorbed by the $NO_x$ absorbent.

29. An exhaust purification device of an internal combustion engine according to claim 28, wherein said $NO_x$ releasing control means immediately lowers the oxygen concentration in the exhaust gas flowing into the $NO_x$ absorbent when the temperature of the exhaust gas flowing into the $NO_x$ absorbent becomes higher than said limit temperature after the oxygen concentration in the exhaust gas flowing into the $NO_x$ absorbent is lowered by said prohibition means.

30. An exhaust purification device of an internal combustion engine according to claim 1, wherein a catalyst which can reduce at least the $NO_x$ is disposed in the exhaust passage of the engine downstream of the $NO_x$ absorbent.

31. An exhaust purification device of an internal combustion engine according to claim 30, wherein said catalyst comprises a three-way catalyst.

32. An exhaust purification device of an internal combustion engine-according to claim 1, wherein a catalyst which can purify the unburnt HC and CO is disposed in the exhaust passage of the engine upstream of the $NO_x$ absorbent.

33. An exhaust purification device of an internal combustion engine according to claim 32, wherein said catalyst comprises a three-way catalyst.

\* \* \* \* \*

UNITED STATES PATENT AND TRADEMARK OFFICE
CERTIFICATE OF CORRECTION

PATENT NO. : 5,473,887
DATED : December 12, 1995
INVENTOR(S) : Shinichi TAKESHIMA et al.

It is certified that error appears in the above-identified patent and that said Letters Patent is hereby corrected as shown below:

| Column | Line | |
|---|---|---|
| 4 | 29 | Delete "$NO_x$ absorbent to the". |
| 8 | 11 | Change "of for example" to --of, for example,--. |
| 11 | 58 | Delete "more". |
| 14 | 36 | Delete "this". |
| 14 | 58 | Delete "flowing into the $NO_x$ absorbent". |
| 15 | 2 | Change "ZNE" to --$\sum NE$--. |
| 15 | 22 | Change "becomes" to --is--. |
| 15 | 25 | Delete "is". |
| 15 | 29 | Before "absorbed" insert --well--. |
| 15 | 30 | Delete "well". |

UNITED STATES PATENT AND TRADEMARK OFFICE
CERTIFICATE OF CORRECTION

PATENT NO. : 5,473,887
DATED : December 12, 1995
INVENTOR(S) : Shinichi TAKESHIMA et al.

It is certified that error appears in the above-identified patent and that said Letters Patent is hereby corrected as shown below:

| Column | Line | |
|---|---|---|
| 16 | 29 | Delete "is". |
| 18 | 24 | After "has" insert --been--. |

Signed and Sealed this

Eleventh Day of June, 1996

Attest:

BRUCE LEHMAN

Attesting Officer     Commissioner of Patents and Trademarks